(12) United States Patent
Booth et al.

(10) Patent No.: US 12,737,996 B2
(45) Date of Patent: Sep. 15, 2026

(54) PROVIDING A SECURED SELF-REPRESENTATION BY WRITING TO A PORTION IF A FRAME BUFFER AFTER OTHER APPLICATIONS HAVE WRITTEN TO THE FRAME BUFFER, WHERE THE OTHER APPLICATIONS CANNOT ACCESS THE SECURED-SELF REPRESENTATION OR THE IMAGES RECEIVED BY A SECURE APPLICATION

(71) Applicant: Meta Platforms Technologies, LLC, Menlo Park, CA (US)

(72) Inventors: James Allan Booth, Pacifica, CA (US); Mahdi Salmani Rahimi, San Francisco, CA (US); Gioacchino Noris, Zurich (CH)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/497,754

(22) Filed: Oct. 30, 2023

(65) Prior Publication Data

US 2024/0062492 A1 Feb. 22, 2024

Related U.S. Application Data

(63) Continuation of application No. 17/930,181, filed on Sep. 7, 2022, now Pat. No. 11,861,757, which is a
(Continued)

(51) Int. Cl.
*G06T 19/00* (2011.01)
*G06N 20/00* (2019.01)
(Continued)

(52) U.S. Cl.
CPC ........... *G06T 19/006* (2013.01); *G06N 20/00* (2019.01); *G06T 15/205* (2013.01); *G06V 40/10* (2022.01)

(58) Field of Classification Search
CPC ..... G06T 19/006; G06T 15/205; G06N 20/00; G06V 40/10
See application file for complete search history.

(56) References Cited

U.S. PATENT DOCUMENTS 6,072,467 A 6/2000 Walker
6,556,196 B1 4/2003 Blanz et al.
(Continued)

FOREIGN PATENT DOCUMENTS

CN 107330969 A 11/2017
CN 113050795 A 6/2021
(Continued)

OTHER PUBLICATIONS

European Search Report for European Patent Application No. 24162068.1, dated Aug. 20, 2024, 8 pages.
(Continued)

*Primary Examiner* — Abderrahim Merouan
(74) *Attorney, Agent, or Firm* — Morgan, Lewis & Bockius LLP

(57) ABSTRACT

The disclosed artificial reality system can provide a user self representation in an artificial reality environment based on a self portion from an image of the user. The artificial reality system can generate the self representation by applying a machine learning model to classify the self portion of the image. The machine learning model can be trained to identify self portions in images based on a set of training images, with portions tagged as either depicting a user from a self-perspective or not. The artificial reality system can display the self portion as a self representation in the
(Continued)

artificial reality environment by positioning them in the artificial reality environment relative to the user's perspective in the artificial reality environment. The artificial reality system can also identify movements of the user and can adjust the self representation to match the user's movement, providing more accurate self representations.

20 Claims, 19 Drawing Sheets

Related U.S. Application Data continuation of application No. 16/734,240, filed on Jan. 3, 2020, now Pat. No. 11,475,639.

(51) Int. Cl.
*G06T 15/20* (2011.01)
*G06V 40/10* (2022.01)

(56) References Cited

U.S. PATENT DOCUMENTS 6,842,175 B1 1/2005 Schmalstieg et al.
7,701,439 B2 4/2010 Hillis et al.
8,026,918 B1 9/2011 Murphy
D683,749 S 6/2013 Hally
D689,874 S 9/2013 Brinda et al.
8,947,351 B1 2/2015 Noble
D726,219 S 4/2015 Chaudhri et al.
D727,352 S 4/2015 Ray et al.
D727,354 S 4/2015 Park et al.
D733,740 S 7/2015 Lee et al.
9,117,274 B2 8/2015 Liao et al.
9,292,089 B1 3/2016 Sadek
D761,273 S 7/2016 Kim et al.
D763,279 S 8/2016 Jou
9,477,368 B1 10/2016 Filip et al.
D775,179 S 12/2016 Kimura et al.
D775,196 S 12/2016 Huang et al.
9,530,252 B2 12/2016 Poulos et al.
D780,794 S 3/2017 Kisielius et al.
D781,905 S 3/2017 Nakaguchi et al.
D783,037 S 4/2017 Hariharan et al.
D784,394 S 4/2017 Laing et al.
D784,395 S 4/2017 Laing et al.
D787,527 S 5/2017 Wilberding
D788,136 S 5/2017 Jaini et al.
D788,793 S 6/2017 Ogundokun et al.
D789,416 S 6/2017 Baluja et al.
D789,977 S 6/2017 Mijatovic et al.
D790,567 S 6/2017 Su et al.
D791,823 S 7/2017 Zhou
D793,403 S 8/2017 Cross et al.
9,770,203 B1 9/2017 Berme et al.
9,817,472 B2 11/2017 Lee et al.
D817,994 S 5/2018 Jou
D819,065 S 5/2018 Xie et al.
D824,951 S 8/2018 Kolbrener et al.
D828,381 S 9/2018 Lee et al.
D829,231 S 9/2018 Hess et al.
D831,681 S 10/2018 Eilertsen
D835,665 S 12/2018 Kimura et al.
10,168,768 B1 1/2019 Kinstner
D842,889 S 3/2019 Krainer et al.
10,220,303 B1 3/2019 Schmidt et al.
10,248,284 B2 4/2019 Itani et al.
D848,474 S 5/2019 Baumez et al.
D850,468 S 6/2019 Malahy et al.
D851,123 S 6/2019 Turner
D853,431 S 7/2019 Sagrillo et al.
D854,551 S 7/2019 Pistiner et al.
D856,366 S 8/2019 Richardson
D859,426 S 9/2019 Poes
10,473,935 B1 11/2019 Gribetz et al.
10,521,944 B2 12/2019 Sareen et al.
10,665,019 B2 5/2020 Hildreth et al.
D888,071 S 6/2020 Wilberding
D900,123 S 10/2020 Lopes
10,839,481 B1 11/2020 Chen
D908,713 S 1/2021 Fremine et al.
D910,655 S 2/2021 Matthewman et al.
D910,660 S 2/2021 Chaturvedi et al.
10,916,220 B2 2/2021 Ngo
10,976,804 B1 4/2021 Atlas et al.
10,987,573 B2 4/2021 Nietfeld et al.
10,990,240 B1 4/2021 Ravasz et al.
11,086,476 B2 8/2021 Inch et al.
11,217,036 B1 1/2022 Albuz et al.
11,276,215 B1 3/2022 Grossinger et al.
11,295,503 B1 4/2022 Orme et al.
11,444,945 B1 9/2022 Ford
11,475,639 B2 10/2022 Booth et al.
11,861,757 B2 1/2024 Booth et al.
11,893,674 B2 2/2024 Orme et al.
12,097,427 B1 9/2024 Schaefer et al.
12,183,035 B1 12/2024 Chen
2004/0266506 A1 12/2004 Herbrich et al.
2005/0162419 A1 7/2005 Kim et al.
2008/0089587 A1 4/2008 Kim et al.
2008/0215994 A1 9/2008 Harrison et al.
2009/0044113 A1 2/2009 Jones et al.
2009/0251471 A1 10/2009 Bokor et al.
2009/0265642 A1 10/2009 Carter et al.
2010/0306716 A1 12/2010 Perez
2011/0148916 A1 6/2011 Blattner
2011/0267265 A1 11/2011 Stinson
2011/0302535 A1 12/2011 Clerc et al.
2012/0069168 A1 3/2012 Huang et al.
2012/0105473 A1* 5/2012 Bar-Zeev .................. G06T 1/20
345/633
2012/0113223 A1 5/2012 Hilliges et al.
2012/0117514 A1 5/2012 Kim et al.
2012/0143358 A1 6/2012 Adams et al.
2012/0206345 A1 8/2012 Langridge
2012/0275686 A1 11/2012 Wilson et al.
2012/0293544 A1 11/2012 Miyamoto et al.
2013/0038601 A1 2/2013 Han et al.
2013/0063345 A1 3/2013 Maeda
2013/0125066 A1 5/2013 Klein et al.
2013/0147793 A1 6/2013 Jeon et al.
2013/0201276 A1 8/2013 Pradeep et al.
2013/0265220 A1 10/2013 Fleischmann et al.
2014/0078176 A1 3/2014 Kim et al.
2014/0125598 A1 5/2014 Cheng et al.
2014/0191946 A1 7/2014 Cho et al.
2014/0236996 A1 8/2014 Masuko et al.
2015/0035746 A1 2/2015 Cockburn et al.
2015/0054742 A1 2/2015 Imoto et al.
2015/0062160 A1 3/2015 Sakamoto et al.
2015/0123967 A1 5/2015 Quinn et al.
2015/0138099 A1 5/2015 Major
2015/0153833 A1 6/2015 Pinault et al.
2015/0160736 A1 6/2015 Fujiwara
2015/0169076 A1 6/2015 Cohen et al.
2015/0181679 A1 6/2015 Liao et al.
2015/0206321 A1 7/2015 Scavezze et al.
2015/0220150 A1 8/2015 Plagemann et al.
2015/0261659 A1 9/2015 Bader et al.
2015/0293666 A1 10/2015 Lee et al.
2015/0358614 A1 12/2015 Jin
2015/0371441 A1 12/2015 Shim
2016/0035133 A1 2/2016 Ye et al.
2016/0062618 A1 3/2016 Fagan et al.
2016/0110052 A1 4/2016 Kim et al.
2016/0147308 A1 5/2016 Gelman et al.
2016/0170603 A1* 6/2016 Bastien ................ H04N 13/254
348/49
2016/0178936 A1 6/2016 Yang et al.
2016/0314341 A1 10/2016 Maranzana et al.
2016/0378291 A1 12/2016 Pokrzywka
2017/0031503 A1 2/2017 Rosenberg et al.
2017/0060230 A1 3/2017 Faaborg et al.
2017/0061696 A1 3/2017 Li et al.

(56) References Cited

U.S. PATENT DOCUMENTS

| | | | | |
|---|---|---|---|---|
| 2017/0109936 | A1 | 4/2017 | Powderly et al. | |
| 2017/0139478 | A1 | 5/2017 | Jeon et al. | |
| 2017/0192513 | A1 | 7/2017 | Karmon et al. | |
| 2017/0236320 | A1 | 8/2017 | Gribetz et al. | |
| 2017/0237789 | A1 | 8/2017 | Harner et al. | |
| 2017/0262063 | A1 | 9/2017 | Blénessy et al. | |
| 2017/0270715 | A1 | 9/2017 | Lindsay et al. | |
| 2017/0278304 | A1 | 9/2017 | Hildreth et al. | |
| 2017/0287225 | A1 | 10/2017 | Powderly et al. | |
| 2017/0296363 | A1 | 10/2017 | Yetkin et al. | |
| 2017/0316606 | A1 | 11/2017 | Khalid et al. | |
| 2017/0336951 | A1 | 11/2017 | Palmaro | |
| 2017/0364198 | A1 | 12/2017 | Yoganandan et al. | |
| 2018/0017815 | A1 | 1/2018 | Chumbley et al. | |
| 2018/0059901 | A1 | 3/2018 | Gullicksen | |
| 2018/0082454 | A1 | 3/2018 | Sahu et al. | |
| 2018/0096537 | A1 | 4/2018 | Kornilov et al. | |
| 2018/0107278 | A1 | 4/2018 | Goel et al. | |
| 2018/0113599 | A1 | 4/2018 | Yin | |
| 2018/0144556 | A1 | 5/2018 | Champion et al. | |
| 2018/0150993 | A1 | 5/2018 | Newell et al. | |
| 2018/0307303 | A1 | 10/2018 | Powderly et al. | |
| 2018/0322701 | A1 | 11/2018 | Pahud et al. | |
| 2018/0335925 | A1 | 11/2018 | Hsiao et al. | |
| 2018/0349690 | A1 | 12/2018 | Rhee et al. | |
| 2019/0050427 | A1* | 2/2019 | Wiesel | G06T 19/00 |
| 2019/0065027 | A1 | 2/2019 | Hauenstein et al. | |
| 2019/0094981 | A1 | 3/2019 | Bradski et al. | |
| 2019/0102044 | A1 | 4/2019 | Wang et al. | |
| 2019/0107894 | A1 | 4/2019 | Hebbalaguppe et al. | |
| 2019/0130172 | A1 | 5/2019 | Zhong et al. | |
| 2019/0188918 | A1 | 6/2019 | Brewer et al. | |
| 2019/0213792 | A1 | 7/2019 | Jakubzak et al. | |
| 2019/0258318 | A1 | 8/2019 | Qin et al. | |
| 2019/0278376 | A1 | 9/2019 | Kutliroff et al. | |
| 2019/0279424 | A1 | 9/2019 | Clausen et al. | |
| 2019/0286231 | A1 | 9/2019 | Burns et al. | |
| 2019/0310757 | A1 | 10/2019 | Lee et al. | |
| 2019/0313915 | A1 | 10/2019 | Tzvieli et al. | |
| 2019/0340419 | A1 | 11/2019 | Milman et al. | |
| 2019/0362562 | A1 | 11/2019 | Benson | |
| 2019/0377416 | A1 | 12/2019 | Alexander | |
| 2019/0385372 | A1 | 12/2019 | Cartwright et al. | |
| 2020/0050289 | A1 | 2/2020 | Hardie-Bick et al. | |
| 2020/0051527 | A1 | 2/2020 | Ngo | |
| 2020/0082629 | A1 | 3/2020 | Jones et al. | |
| 2020/0097077 | A1 | 3/2020 | Nguyen et al. | |
| 2020/0097091 | A1 | 3/2020 | Chou et al. | |
| 2020/0110280 | A1 | 4/2020 | Gamperling et al. | |
| 2020/0111260 | A1 | 4/2020 | Osborn et al. | |
| 2020/0211218 | A1 | 7/2020 | Le Gallou et al. | |
| 2020/0211512 | A1 | 7/2020 | Sztuk et al. | |
| 2020/0225736 | A1 | 7/2020 | Schwarz et al. | |
| 2020/0225758 | A1 | 7/2020 | Tang et al. | |
| 2020/0226814 | A1 | 7/2020 | Tang et al. | |
| 2020/0306640 | A1 | 10/2020 | Kolen et al. | |
| 2020/0312002 | A1 | 10/2020 | Comploi et al. | |
| 2020/0349635 | A1 | 11/2020 | Ghoshal et al. | |
| 2021/0007607 | A1 | 1/2021 | Frank et al. | |
| 2021/0011556 | A1 | 1/2021 | Atlas et al. | |
| 2021/0019911 | A1 | 1/2021 | Kusakabe et al. | |
| 2021/0088811 | A1 | 3/2021 | Varady et al. | |
| 2021/0090333 | A1* | 3/2021 | Ravasz | G02B 27/01 |
| 2021/0124475 | A1 | 4/2021 | Inch et al. | |
| 2021/0134042 | A1 | 5/2021 | Streuber et al. | |
| 2021/0168324 | A1 | 6/2021 | Ngo | |
| 2021/0247846 | A1 | 8/2021 | Shriram et al. | |
| 2021/0296003 | A1 | 9/2021 | Baeurele | |
| 2021/0312658 | A1 | 10/2021 | Aoki et al. | |
| 2021/0342972 | A1 | 11/2021 | Mironica et al. | |
| 2021/0383594 | A1 | 12/2021 | Tang et al. | |
| 2022/0021972 | A1 | 1/2022 | Brimijoin, II et al. | |
| 2022/0092853 | A1 | 3/2022 | Booth et al. | |
| 2022/0125553 | A1* | 4/2022 | Lemchen | A61C 5/77 |
| 2022/0157036 | A1 | 5/2022 | Chen et al. | |
| 2022/0258420 | A1* | 8/2022 | Märklin | B33Y 30/00 |
| 2022/0292774 | A1 | 9/2022 | Yang et al. | |
| 2023/0021339 | A1 | 1/2023 | Bosnak et al. | |
| 2023/0062670 | A1* | 3/2023 | Wang | A61C 7/002 |
| 2023/0115028 | A1 | 4/2023 | Arunachala | |
| 2023/0252721 | A1 | 8/2023 | Aleem et al. | |
| 2023/0351710 | A1 | 11/2023 | Doyle et al. | |
| 2024/0062492 | A1* | 2/2024 | Booth | G06V 20/20 |
| 2024/0087201 | A1 | 3/2024 | Orme et al. | |
| 2024/0104180 | A1 | 3/2024 | S et al. | |
| 2024/0212388 | A1 | 6/2024 | Li et al. | |
| 2024/0221270 | A1 | 7/2024 | Leyton et al. | |
| 2024/0346729 | A1 | 10/2024 | Ivanov et al. | |

FOREIGN PATENT DOCUMENTS

| | | | |
|---|---|---|---|
| JP | 2021517689 | A | 7/2021 |
| WO | 03058518 | A2 | 7/2003 |
| WO | 2016177290 | A1 | 11/2016 |
| WO | 2017205903 | A1 | 12/2017 |
| WO | 2019137215 | A1 | 7/2019 |
| WO | 2023075771 | A1 | 5/2023 |

OTHER PUBLICATIONS

International Preliminary Report on Patentability for International Application No. PCT/US2023/020446, mailed Nov. 7, 2024, 12 pages.

Liu Y., et al., “Learning to Predict Salient Faces: a Novel Visual-Audio Saliency Model,” Computer Vision—ECCV 2020, Lecture Notes in Computer Science, 2020, vol. 12365, 17 Pages.

Chen Y., et al., “Object Modeling by Registration of Multiple Range Images,” Proceedings of the 1991 IEEE International Conference on Robotics and Automation, Apr. 1991, pp. 2724-2729, Retrieved from the internet: URL: https://graphics.stanford.edu/courses/cs348a-17-winter/Handouts/chen-medioni-align-rob91.pdf.

Goldsmiths M, “Dancing into the Metaverse: A Real-Time virtual Dance Experience,” Youtube [online], Nov. 14, 2021 [Retrieved on Sep. 5, 2023], 2 pages, Retrieved from the Internet: URL: https://www.youtube.com/watch?v=aNg-gqZNYRO.

Hincapie-Ramos J.D., et aL, “GyroWand: IMU-Based Raycasting for Augmented Reality Head-Mounted Displays,” Proceedings of the 3rd Association for Computing Machinery (ACM) Symposium on Spatial User Interaction, Los Angeles, CA, USA, Aug. 8-9, 2015, pp. 89-98.

International Preliminary Report on Patentability for International Application No. PCT/US2020/052976, mailed May 5, 2022, 9 pages.

International Preliminary Report on Patentability for International Application No. PCT/US2021/064674, mailed Jul. 6, 2023, 12 pages.

International Search Report and Written Opinion for International Application No. PCT/US2020/052976, mailed Dec. 11, 2020, 10 Pages.

International Search Report and Written Opinion for International Application No. PCT/US2021/064674, mailed Apr. 19, 2022, 13 pages.

International Search Report and Written Opinion for International Application No. PCT/US2022/046196, mailed Jan. 25, 2023, 11 pages.

International Search Report and Written Opinion for International Application No. PCT/US2023/020446, mailed Sep. 14, 2023, 14 pages.

Junghyun A., et al., “Motion Level-of-Detail: A Simplification Method on Crowd Scene,” Proceedings of the 17th International Conference on Computer Animation and Social Agents [online], Jan. 23, 2013 [Retrieved on Sep. 7, 2023], 8 pages, Retrieved from the Internet: URL:https://citeseerx.ist.psu.edu/viewdoc/download;jsessionid=460ED1CB79EFA18B484B256E73A88FF3 ?.

Katz N., et al., “Extending Web Browsers with a Unity 3D-Based Virtual Worlds Viewer,” IEEE Computer Society, Sep./Oct. 2011, vol. 15 (5), pp. 15-21.

(56) References Cited

OTHER PUBLICATIONS

Khan M.A., "Multiresolution Coding of Motion Capture Data for Real-Time Multimedia Applications," Multimedia Tools and Applications, Sep. 16, 2016, vol. 76, pp. 16683-16698.
Mayer S., et aL, "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.
Milborrow S., "Active Shape Models with Stasm," [Retrieved on Sep. 20, 2022], 3 pages, Retrieved from the internet: URL: http://www.milbo.users.sonic.net/stasm/.
Milborrow S., et al., "Active Shape Models with SIFT Descriptors and Mars," Department of Electrical Engineering, 2014, 8 pages, Retrieved from the internet: URL: http://www.milbo.org/stasm-files/active-shape-models-with-sift-and-mars.pdf.
Moran F., et al., "Adaptive 3D Content for Multi-Platform On-Line Games," 2007 International Conference on Cyberworlds (CW'07), Oct. 24, 2007, pp. 194-201.
MRPT: "Ransac C++ Examples," 2014, 6 pages, Retrieved from the internet: URL: https://www.mrpt.org/tutorials/programming/maths-and-geometry/ransac-c-examples/.
Nextworldvr, "Realtime Motion Capture 3ds Max w/ KINECT," Youtube [online], Mar. 14, 2017 [Retrieved on Sep. 5, 2023], 2 pages, Retrieved from the Internet: URL:https://www.youtube.com/watch?v=vOYWYEOwRGO.
Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.
Qiao X., et al., "Web AR: A Promising Future for Mobile Augmented Reality—State of the Art, Challenges, and Insights," Proceedings of the IEEE, Apr. 2019, vol. 107 (4), pp. 651-666.
Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeife/lehre/VirtualReality/interaction/ray_casting.html.
Savoye Y., et al., "Multi-Layer Level of Detail for Character Animation," Workshop in Virtual Reality Interactions and Physical Simulation VRIPHYS (2008) [online], Nov. 18, 2008 [Retrieved on Sep. 7, 2023], 10 pages, Retrieved from the Internet: URL: http://www.animlife.com/publications/vriphys08.pdf.
Schweigert R., et aL, "EyePointing: A Gaze-Based Selection Technique," Proceedings of Mensch and Computer, Hamburg, Germany, Sep. 8-11, 2019, pp. 719-723.
Srinivasa R.R., "Augmented Reality Adaptive Web Content," 13th IEEE Annual Consumer Communications Networking Conference (CCNC), 2016, pp. 1-4.
Trademark U.S. Appl. No. 73/289,805, filed Dec. 15, 1980,1 page.
Trademark U.S. Appl. No. 73/560,027, filed Sep. 25, 1985,1 page.
Trademark U.S. Appl. No. 74/155,000, filed Apr. 8, 1991,1 page.
Trademark U.S. Appl. No. 76/036,844, filed Apr. 28, 2000,1 page.
Unity Gets Toolkit for Common AR/VR Interactions, Unity XR interaction Toolkit Preview [Online], Dec. 19, 2019 Retrieved on Apr. 7, 2020], 1 page, Retrieved from the Internet: URL: http://youtu.be/ZPhv4qmT9EQ.
Whitton M., et al., "Integrating Real and Virtual Objects in Virtual Environments," Aug. 24, 2007, Retrieved from http://web.archive.org/web/20070824035829/ http://www.cs.unc.edu/~whitton/ExtendedCV/Papers/2005-HCII-Whitton-MixedEnvs.pdf, on May 3, 2017, 10 pages.
Wikipedia: "Canny Edge Detector," [Retrieved on Sep. 20, 2022], 10 pages, Retrieved from the internet: URL: https://en.wikipedia.org/wiki/Canny_edge_detector.
Wikipedia: "Iterative Closest Point," [Retrieved on Sep. 20, 2022], 3 pages, Retrieved from the internet: URL: https://en.wikipedia.org/wiki/Iterative_closest_point.
Huang B., et al., "Eye Landmarks Detection via Weakly Supervised Learning," Pattern Recognition, Feb. 2020, vol. 98, 11 pages.
International Preliminary Report on Patentability for International Application No. PCT/US2022/046196, mailed Apr. 25, 2024, 9 pages.
Tang X., et al., "Facial Landmark Detection by Semi-Supervised Deep Learning," Neurocomputing, Jul. 5, 2018, vol. 297, pp. 22-32.
Wan Z., et al., "A Method of Free-Space Point-of-Regard Estimation Based on 3D Eye Model and Stereo Vision," Applied Science, Sep. 30, 2018, vol. 08, No. 10, 17 pages.
Wu C., et al., "Automatic Eyeglasses Removal from Face Images," IEEE Transactions on Pattern Analysis and Machine Intelligence, Mar. 2004, vol. 26, No. 03, pp. 322-336.

* cited by examiner 902
1152
1154
1108
1156

PROVIDING A SECURED SELF-REPRESENTATION BY WRITING TO A PORTION IF A FRAME BUFFER AFTER OTHER APPLICATIONS HAVE WRITTEN TO THE FRAME BUFFER, WHERE THE OTHER APPLICATIONS CANNOT ACCESS THE SECURED-SELF REPRESENTATION OR THE IMAGES RECEIVED BY A SECURE APPLICATION

CROSS-REFERENCE TO RELATED APPLICATIONS

This application is a continuation of U.S. patent application Ser. No. 17/930,181, filed Sep. 7, 2022, titled "Self Presence in Artificial Reality," currently pending which is a continuation of U.S. patent application Ser. No. 16/734,240, filed Jan. 3, 2020, titled "Self Presence in Artificial Reality," now U.S. Pat. No. 11,475,639 issued on Oct. 18, 2022, both of which are herein incorporated by reference in their entirety.

TECHNICAL FIELD

The present disclosure is directed to artificial reality systems with self-views to provide immersive experiences.

BACKGROUND

Artificial reality systems provide users the ability to experience different worlds, learn in new ways, and make better connections with others. These artificial reality systems can track user movements and translate them into interactions with virtual objects. For example, an artificial reality system can track a user's hands, translating a grab gesture as picking up a virtual object, and can track a user's feet to identify when a user kicks a virtual object. When performing such actions in an artificial reality environment, users often feel disconnected from the environment, or can even become physically sick, when they look down and see a computer-generated environment that does not show the user's body. Some artificial reality systems have addressed this issue by mapping tracked user body parts to a user kinematic model to determine relative orientations of the user's body parts. These systems can then create an avatar of the user in the artificial reality environment that generally coincides with the user's movements.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
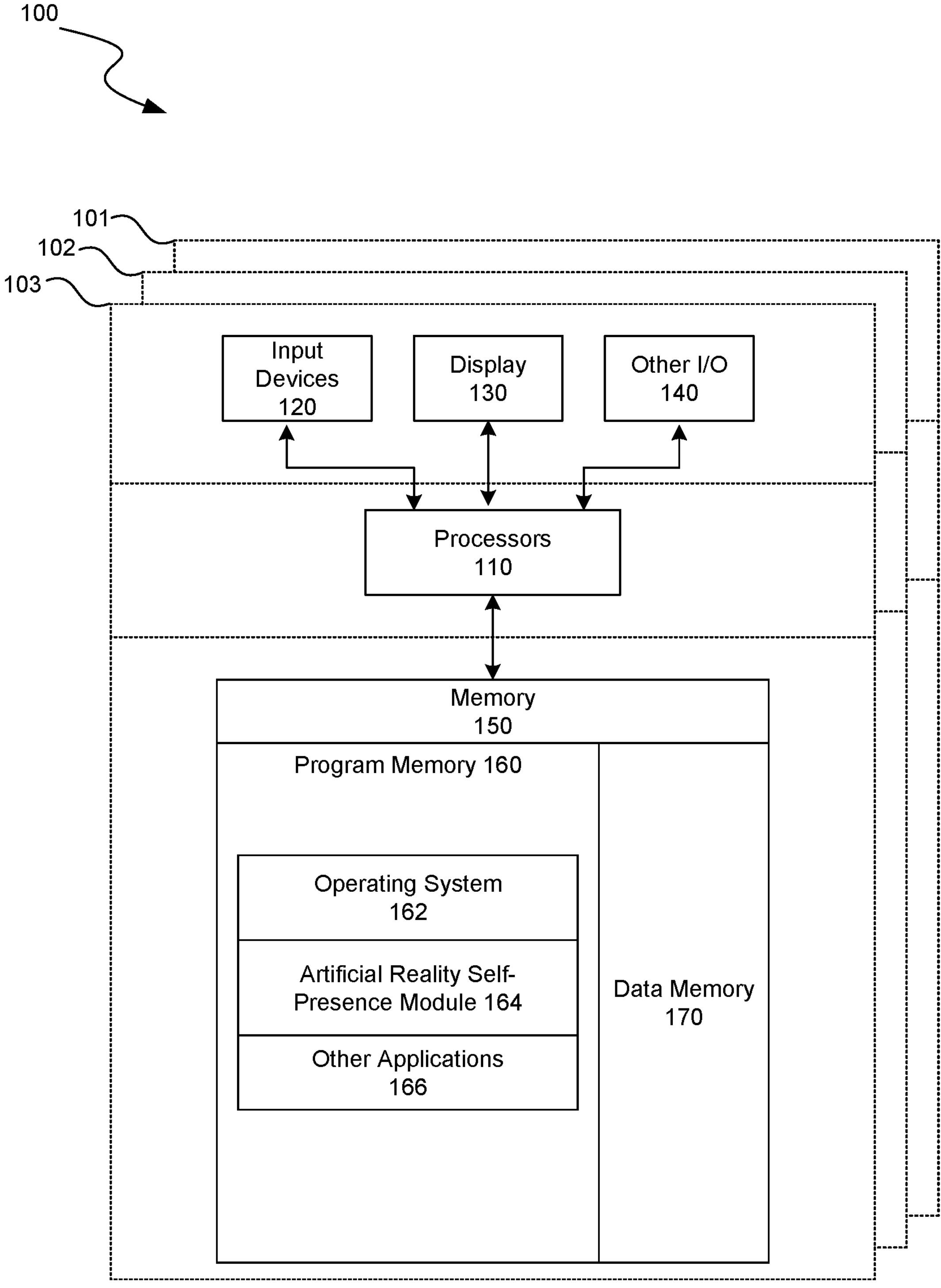
FIG. 1 is a block diagram illustrating an overview of devices on which some implementations of the present technology can operate.

Embodiments for providing a self representation of a user in an artificial reality environment based on an identified self portion of images of the user are described herein. A self representation is a representation of a user, in an artificial reality environment, that the user can themselves see. For example, when a user looks down or at her hands when in an artificial reality environment and sees a representation of herself, that is the user's self representation. The self representation may or may not be visible to other users in the artificial reality environment. A self portion of an image is a portion of an image that depicts the user from that user's perspective, excluding other parts of the image that do not depict that user. For example, in an image taken from near a user's perspective, including that user's hands and chest, another user, and a table, the self portion is just the depicted user's hands and chest. An artificial reality system can generate the self representation by capturing images of the user, in real time, and applying a machine learning model to classify a self portion of each of the images. The artificial reality system can display a version of the self portions as a self representation in the artificial reality environment by positioning the version in the artificial reality environment relative to the user's perspective view into the artificial reality environment.

In some implementations, an artificial reality system can contemporaneously capture images, in real time, using one or more cameras. As used herein, contemporaneous means events that occur at the same time or within a threshold time of each other. For example, contemporaneously captured images refers to images captured at the same time or within a threshold time of each. As also used herein, images captured in real time are images that are captured, processed according to the algorithms described herein, and whose results are provided to create a self representation within a particular time limit that permits the self representation to accurately reflect the user's current body posture to a threshold level. Examples of this time limit are A) a set number of nano-seconds, B) the amount of time to produce one frame of video, or C) other time limits that keep the lag of the self representation below a threshold level. The artificial reality system can merge the contemporaneously captured images into a single image and adjust them to be from the user's perspective. This can include determining distances between the center of the user's eye and each of the cameras and using these distances to warp the images to be from the user's perspective, instead of from the viewpoint of the cameras that captured them. The artificial reality system can also match features between the images to determine overlap and stitch the images together. These two steps, which may be performed in either order, produce a single image of the real-world environment from the user's perspective. In some instances only a single camera is used, in which case no image stitching is used but perspective warping may still be applied. Depending on the angle of the camera(s), the resulting image may include a self portion depicting at least part of the artificial reality system user.

The artificial reality system can identify the self portion by applying a machine learning model to the image. This machine learning model can be of various types such as a type of neural network, a support vector machine, Bayes classifier, decision tree, etc. The machine learning model can be trained to identify self portions in images based on a set of training images, with portions (e.g., set areas, pixels, etc.) tagged as either depicting a user from a self-perspective or not. The model can be trained by applying these training images to the model and adjusting the model based on how close the model output is to the correct output for each portion of the image. For example, where the machine learning model is a neural network, parameters or edge weights can be adjusted such that the output of the model more closely matches the correct classifications for the image portions. Once trained, this machine learning model can then be applied to new images to classify which parts of the image depict the user of the artificial reality system.

The artificial reality system can use the classifications from the machine learning model to create a mask, which then can be applied to the original image to extract the self portion from the image. The artificial reality system can then display this self portion relative to the perspective of the user in the artificial reality environment, e.g., below the user's perspective, creating a self representation of the user in the artificial reality environment.

As an example of the disclosed processes and systems in use, a user may be wearing an artificial reality headset of an artificial reality system with five front and side facing cameras. Within a 2 ms timeframe, the cameras can each capture an image, which the artificial reality system can warp to be from the user's perspective based on the distance of each camera from the user's eye and can stitch these five images into a single image. The artificial reality system can then identify a self portion of the image that depicts part of the user's torso, hands, arms, legs and feet by applying a trained machine learning model. The area of the identified self portion can be used as a mask to extract the self portion from the image. The artificial reality system can then display the extracted self portion in the artificial reality system relative to the user's point of view, thus allowing the user to see a self representation showing her real-world torso, hands, arms, legs and feet in the artificial reality environment.

The artificial reality system can also identify movements of the user, e.g., by tracking a controller or a body part of the user. Based on this movement, instead of having to capture a new self portion of the user and create a new self representation, the artificial reality system can adjust the self representation to match the user's movement. This can provide more accurate self representations. For example, a controller may be able to report its position to an artificial reality system headset more quickly than the artificial reality system can capture images and create a new self representation. By warping the existing self representation to match the movement until a new self representation can be created from more current captured self portions of images, the artificial reality system can keep the self representation spatially accurate according to the user's body position.

Embodiments of the disclosed technology may include or be implemented in conjunction with an artificial reality system. Artificial reality or extra reality (XR) is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Existing artificial reality systems fail to accurately display representations of a user in an artificial reality environment. Representations of an artificial reality system user created by existing artificial reality systems are based on tracking body parts of the user and mapping those to parts of an avatar created in the artificial reality environment. This analysis of captured images to identify parts of a user, determine spatial relationships of the user, and generate an avatar accordingly positioned is a computationally expensive procedure. In addition, such existing systems tend to lag behind the user's actual movements and/or, due to inaccuracies in body tracking, do not correctly position parts the avatar in the artificial reality environment to match the user's movements. Further, due to graphic system limitations, computer generated avatars often fail to provide rich detail and can distract users from their artificial reality experience. Yet, users tend to find artificial reality environments without a representation of the user to be disconcerting and can even make some users nauseous.

The real-world self representation system and processes described herein overcome these problems associated with existing artificial reality systems and are expected to provide self representations that are less computationally expensive, more accurate, and more detailed than those provided by existing systems. Specifically, the process of capturing images, applying a machine learning model to extract a self portion, and displaying the self portion as a self representation can be performed with significantly less computing power than that required by existing systems to track part of a user, map determined body positions into a virtual space, and render an avatar positioned according to the determined body positions. Further, by taking images of the user and using them directly as the self representation, this process more accurately reflects the user's movements and doesn't rely on inaccurate position tracking systems, making the disclosed artificial reality system much more accurate than existing artificial reality systems. Finally, by using real world images of the user instead of computer generated avatars, the self representations provided by the disclosed system can be much more detailed than those provided by existing artificial reality systems, while still being malleable, e.g., through the use of filters and composites.

Several implementations are discussed below in more detail in reference to the figures. FIG. 1 is a block diagram illustrating an overview of devices on which some implementations of the disclosed technology can operate. The devices can comprise hardware components of a computing system 100 that can provide real-world self representations of a user in an artificial reality environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, artificial reality self-presence module 164, and other application programs 166. Memory 150 can also include data memory 170 that can include, for example, trained machine learning models, user images, extracted self portions, warping models, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
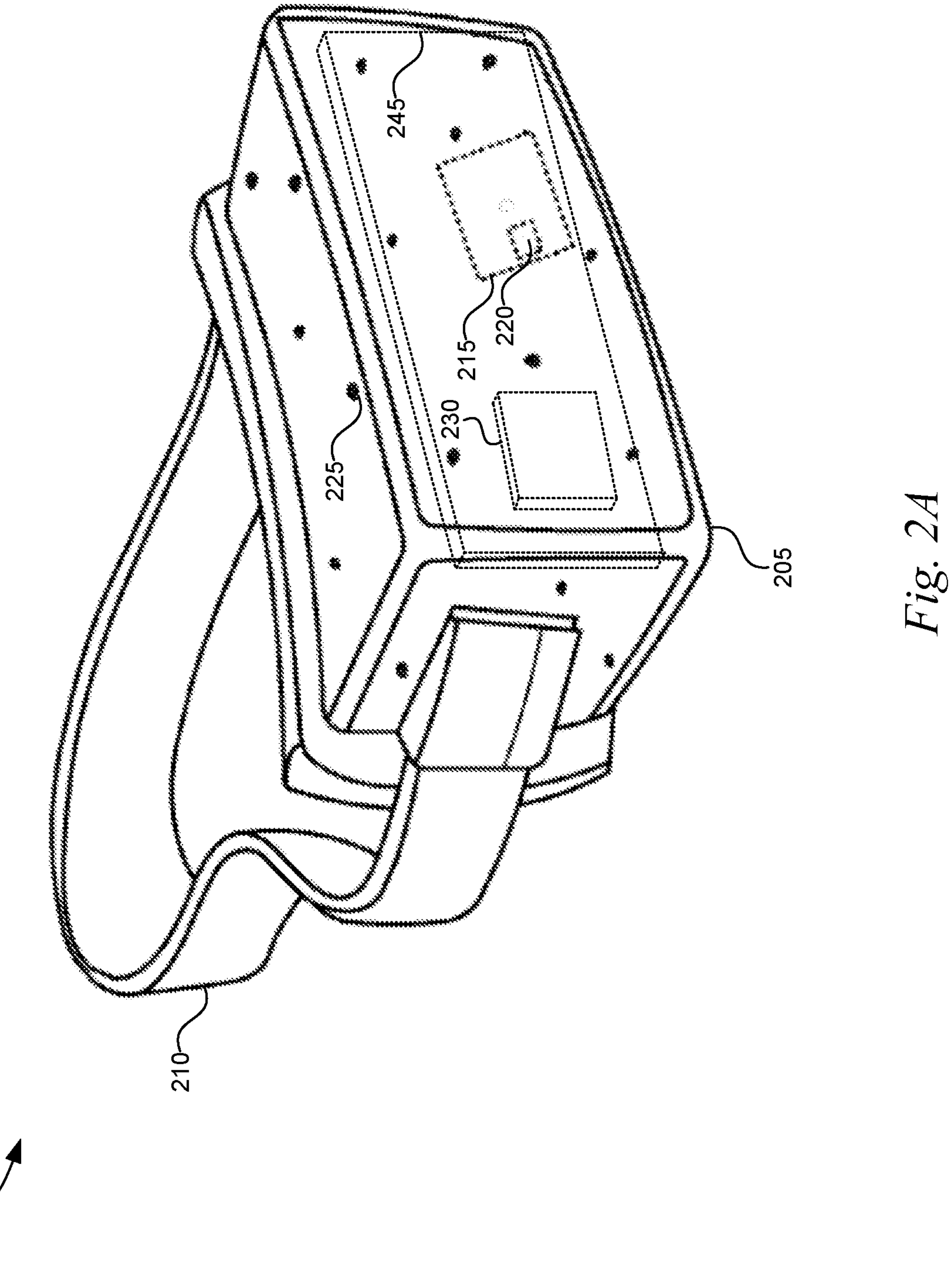
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

In some implementations, the HMD 200 can be in communication with one or more other external devices, such as controllers (not shown) which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc. In some implementations, instead of or in addition to controllers, one or more cameras included in the HMD 200 or external to it can monitor the positions and poses of the user's hands to determine gestures and other hand and body motions.

Figure 2B:
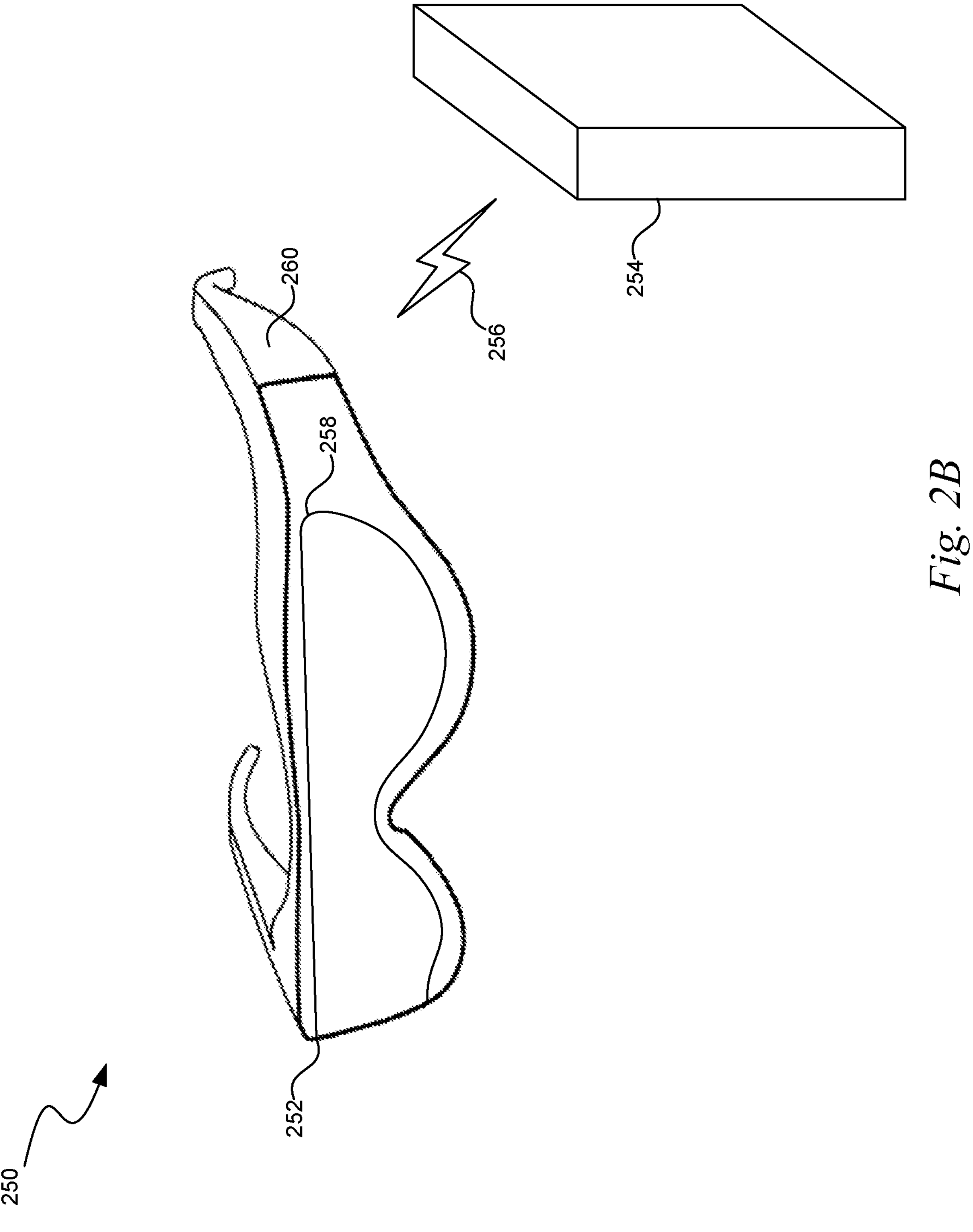
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 3:
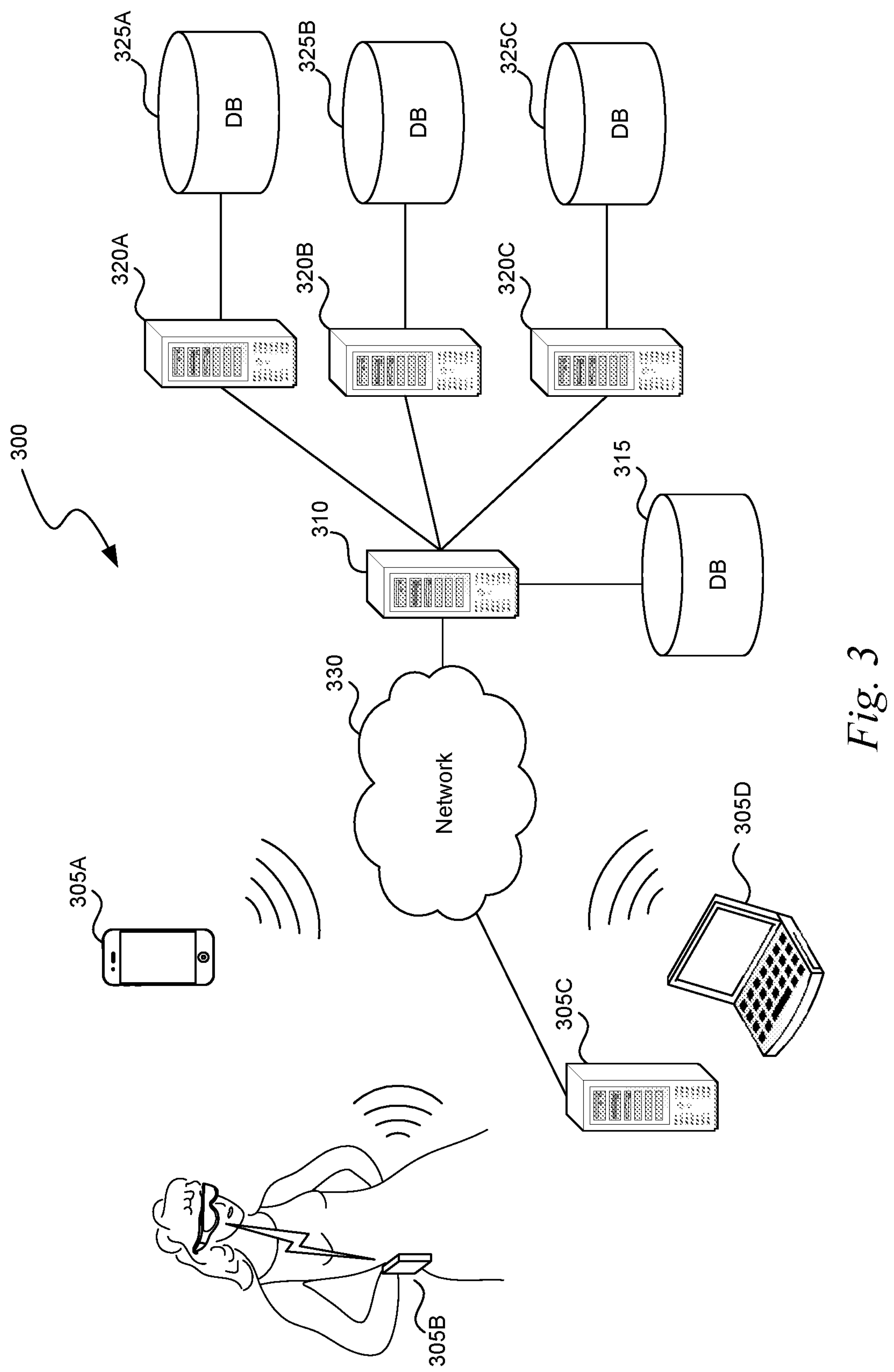
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
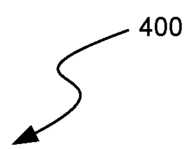
FIG. 4 is a block diagram illustrating components which, in some implementations, can be used in a system employing the disclosed technology.
Figure 4:
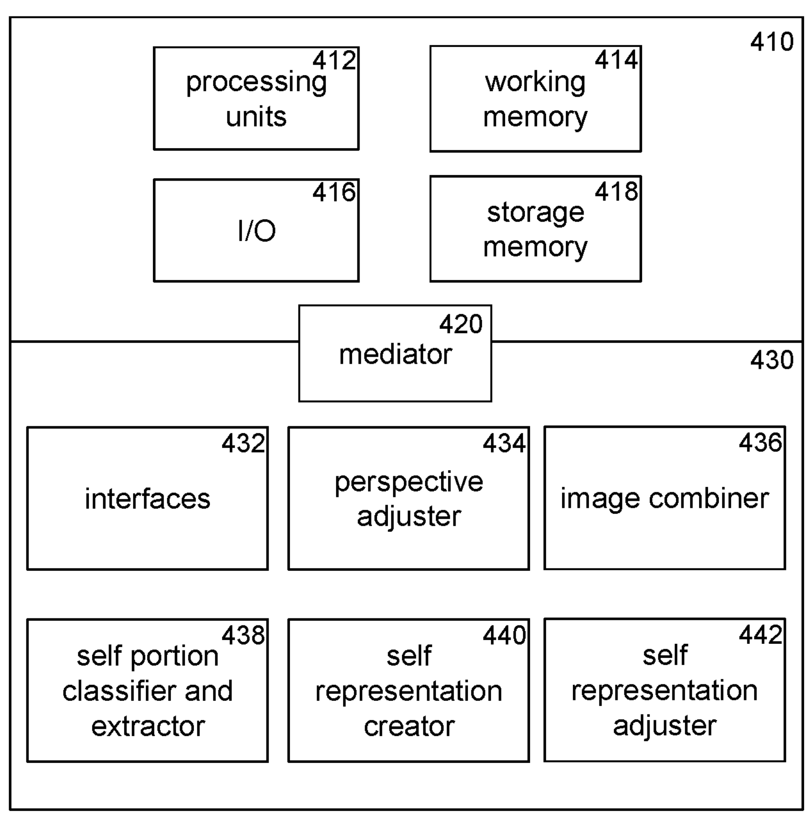

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for creating and updating a self representation, in an artificial reality environment, based on images depicting part of a user. Specialized components 430 can include perspective adjuster 434, image combiner 436, self portion classifier and extractor 438, self representation creator 440, self representation adjuster 442, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430.

Perspective adjuster 434 can determine one or more distances and directions between a user's eye and a camera (or averages with multiple cameras) and use these to adjust an image to be from the user's perspective. In some implementations, perspective adjuster 434 can accomplish this by applying a vector transformation, to the image, that warps the image based on the determined distances and/or directions. In other implementations, perspective adjuster 434 can accomplish this by converting the image to a 3D representation (e.g., using machine learning models) and modifying the image to be a view of the 3D representation with a virtual camera moved according to the determined distances and/or directions. Additional details on adjusting an image to be from the user's perspective are provided below in relation to block 504 of FIG. 5, blocks 606 and 608 of FIG. 6, and FIG. 10C.

Image combiner 436 can identify overlaps or matching features between multiple images and combine them into a single image. In some implementations, this includes modifications to the images such as resizing, warping, rotating, etc., to get the images to form a cohesive single image. Additional details on combining multiple images are provided below in relation to block 504 of FIG. 5, block 604 of FIG. 6, and FIG. 10B.

Self portion classifier and extractor 438 can use a machine learning model to classify areas of an image as either depicting a self portion of a user or not. In some implementations, the machine learning classifier can also label parts of the self portion with body part identifiers (e.g., fingers, hands, forearms, upper arms, chest, stomach, upper legs, lower legs, feet, etc.). The machine learning classifier can be a type of neural network (e.g., a traditional neural network, a deep neural network, a convolutional neural network, a recurrent neural network, combinations of these, etc.) or can be another type of machine learning model. The machine learning model can be trained using images where at least some of the images have portions labeled as either being part of a self portion or not and/or with body part identifiers. Using the result of the machine learning model classification of an image, the self portion classifier and extractor 438 can extract the self portion from the image. For example, the self portion classifier and extractor 438 can do this by using the identified areas as a mask for the image and filtering out the portions of the image that are not covered by the mask. Additional details on classifying a self portion of an image and extracting it are provided below in relation to block 506 of FIG. 5, FIG. 7, FIGS. 9A-9C, and FIGS. 11A-11B.

Self representation creator 440 can take the self portion extracted by the self portion classifier and extractor 438 and insert it into an artificial reality environment as a self representation. In some instances, the self representation creator 440 can do this by overwriting the self representation onto a portion of a frame buffer to which an application controlling the artificial reality environment is writing. The overwritten portion can correspond to an area in the artificial reality environment that is below the current virtual camera position representing the user's point of view. In other implementations, the self representation can be provided to the application controlling the artificial reality environment to include in the artificial reality environment as a normal virtual object. Additional details on adding a self representation to an artificial reality environment based on a self portion extracted from an image are provided below in relation to block 508 of FIG. 5 and FIG. 9C.

Self representation adjuster 442 can identify a user movement (e.g., direction and distance) and can adjust a self representation in the artificial reality environment to match the movement. In some implementations, self representation adjuster 442 can achieve this by applying a warping algorithm to the self representation to move and/or resize a portion of the self representation that matches the part of the user that moved. In some implementations, the adjustment can be based on the user body parts identified by the self portion classifier and extractor 438. For example, if the artificial reality system identifies that the user's leg has moved out and up by seven inches, the self representation adjuster 442 can warp the portion of the self representation showing the leg to be slightly longer and larger, accounting for more of the leg being shown and being closer to the user's viewpoint. In other implementations, the adjustment to the self representation can include converting the self representation into a 3D object in the artificial reality environment, which can then be moved to match the user's movement. Additional details on adjusting an existing self representation based on user movements are provided below in relation to FIG. 8 and FIGS. 12A and 12B.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
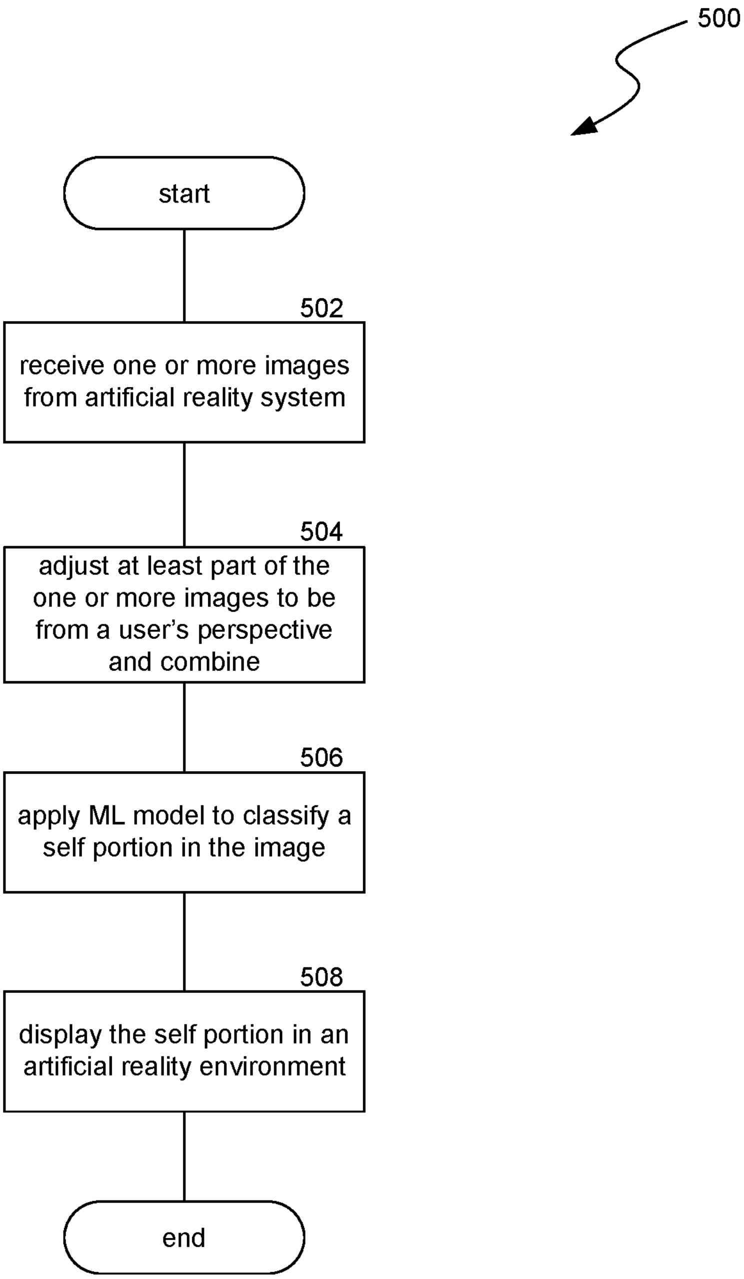
FIG. 5 is a flow diagram illustrating a process used in some implementations of the present technology for displaying a self representation in an artificial reality environment based on one or more images of a user.

FIG. 5 is a flow diagram illustrating a process 500 used in some implementations for displaying a self representation in an artificial reality environment based on one or more images of a user. In some implementations, process 500 can be performed repeatedly during use of an artificial reality system. For example, process 500 can be performed by an operating system of an artificial reality system or by another application that is able to insert virtual objects into the artificial reality environment. In some implementations, process 500 can be distributed between multiple applications, e.g., where capturing images and extracting the self portions is performed by an operating system of the artificial reality system, which passes them to an application which creates the self representation and inserts the self representation into the artificial reality environment.

At block 502, process 500 can receive one or more images from the hardware of the artificial reality system. In various implementations, this can be a single image or multiple images. Where there are multiple images, these can be images that the artificial reality system captured contemporaneously. These one or more images can be captured in real time. In some implementations, a subset of the artificial reality system's cameras can be used to capture these one or more images, e.g., only using cameras that are at least partially front facing. In some implementations, the cameras used to capture these one or more images can be based on a determination of which cameras are pointing at least partially forward and/or downward relative to the user's body, e.g., based on rotation and/or orientation sensors in the artificial reality system and/or position sensors in other artificial reality system controllers.

At block 504, process 500 can adjust at least part of the one or more images to be from the user's perspective. In addition, where there are multiple captured images, these images can also be stitched together to form a single image. Adjusting the image(s) to be from the user's perspective can be based on determined distances between the user's eyes and the cameras that captured the image(s). Stitching the images together into a single image can be performed by matching features between the images to determine overlap and combining the images at the determined overlaps. Additional details on adjusting images for user perspective and stitching images together are described below in relation to FIGS. 6 and 10A-C.

At block 506, process 500 can classify a self portion of the single image or the combined image by applying a machine learning model trained to identify user self portions to the image. The model can be a neural network or other machine learning model. The model can be trained using images with portions labeled as either depicting the user of the artificial reality system or not depicting that user, where the labels are comparison factors used to adjust model parameters to minimize a loss function. In various implementations, the machine learning model can be applied to the image on a pixel by pixel basis or to groups of pixels. The machine learning model can provide an identification of an area or mask specifying the part of the image that is a self portion. Process 500 can use this mask to extract the self portion from the image. Additional details on using machine learning results to create a mask and extract a self portion from an image are described below in relation to FIGS. 7, 9A, 9B, 11A, and 11B.

At block 508, process 500 can display the self portion of the image, extracted at block 506, as a self representation in the artificial reality environment. In some implementations, the self representation can be displayed in the artificial reality environment at a location relative to, e.g., a specified amount below, the perspective of the user of the artificial reality system. This amount can be a typical amount distance between the typical user's viewpoint and the top of where they can usually see their own body. In some implementations, this distance can be set based on the height of the user.

In some implementations, the self portion can be displayed as the self representation by overwriting data for the self portion into a portion of a frame buffer that is being written to by an application controlling part of the artificial reality environment. This prevents the application controlling part the of the artificial reality environment (e.g., a third party application) from having access the data for the self portion, i.e., it does not have access to real images of the user.

In some implementations, the artificial reality system can modify the self portion before it is displayed in the artificial reality environment. For example, the artificial reality system can apply a filter to the self portion to make it match a genre of the artificial reality environment. For example, the artificial reality system can apply a filter to change the color scheme or shading, a filter that modifies dimensions of the self portion, a filter that changes the drawing style of the self portion (e.g., making it a line drawing, a cartoon, etc.), a filter that warps the self portion or applies a distortion field to the self portion, etc. In some implementations, the machine learning model used at block 506 or another machine learning model can further classify the parts of the self image as parts of a user's body. An application controlling the artificial reality environment can specify an effect to apply to these parts individually, e.g., by mapping a composite layer over each part (or over the self portion as a whole) or applying one of the filters to the indicated part of the self portion.

In some implementations, the artificial reality system can modify the self representation after it is initially displayed in the artificial reality environment. For example, the artificial reality system can identify a motion of a user based on tracking a body part of the user or tracking hardware controllers of the artificial reality system. When a user motion is identified before a new self portion is ready to be used to update the self representation, a distance and direction of the movement can be determined. These values can be used to warp the self representation to conform to the current user position. In this manner, the self representation can be kept consistent with user movements, even when the image capture and extraction processes lag behind the movements. Additional details on warping a self representation to conform to user movements are described below in relation to FIGS. 8, 12A, and 12B.

Figure 6:
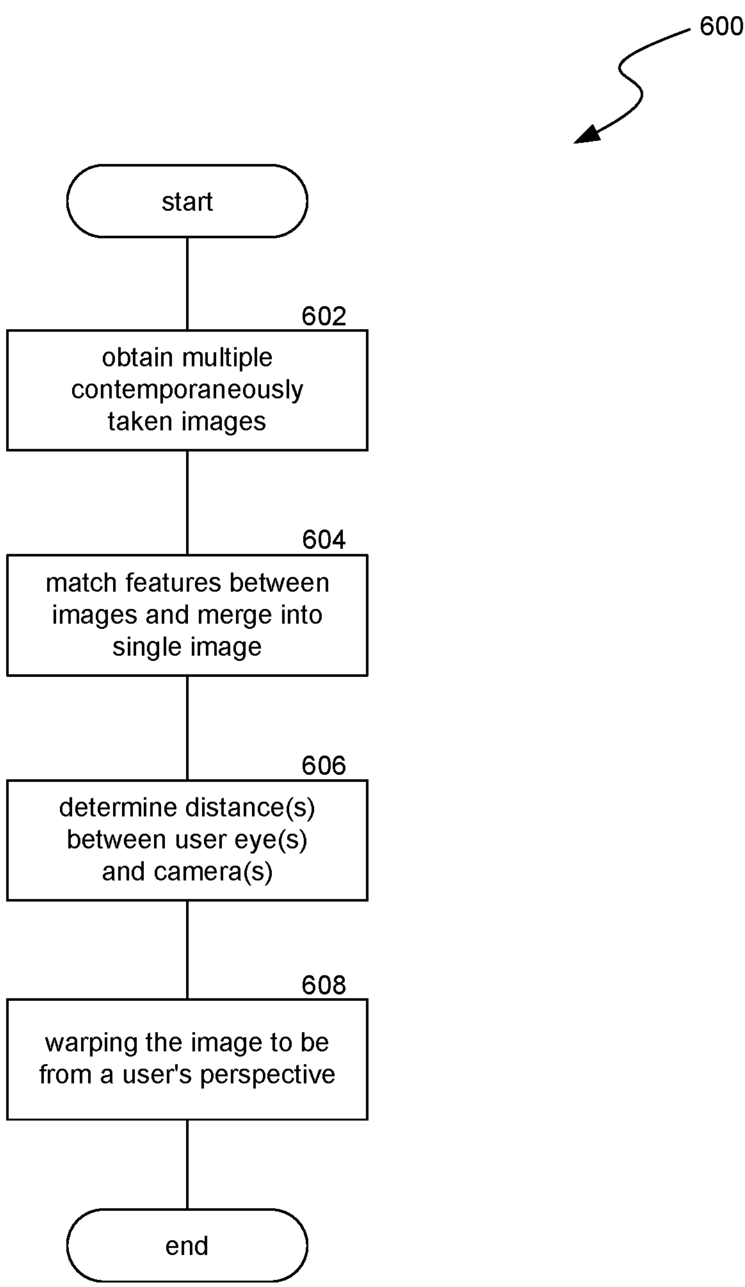
FIG. 6 is a flow diagram illustrating a process used in some implementations of the present technology for merging multiple user images and adjusting them to be from a user's perspective.

FIG. 6 is a flow diagram illustrating a process 600 used in some implementations for merging multiple user images and adjusting them to be from a user's perspective. In some implementations, process 600 can be performed as a sub-process of process 500, e.g., called at block 504.

At block 602, process 600 can obtain multiple contemporaneously taken images. These images can be taken by a single camera of the artificial reality system (e.g., a successive burst of image captures) or by multiple cameras positioned at different locations on the artificial reality system (e.g., multiple cameras mounted on a headset of the artificial reality system). In some implementations, these can be the images obtained at block 502. In some implementations only a single image is taken, in which case process 600 can begin at block 606 instead of 602. An example of taking multiple contemporaneous images is described below in relation to FIG. 10A.

At block 604, process 600 can match features between the multiple images and, based on matched features indicating overlaps between the images, merge the images into a single image. An example of matching features between images and merging them is described below in relation to FIG. 10B.

At block 606, process 600 can determine one or more distances between each camera that captured one of the multiple images and one of the user's eyes (e.g., the eye closest to that camera) or to a center of vision between the user's eyes. These distances can also include direction (e.g., vectors) specifying a shift from where the camera is located to where the user's eye is.

At block 608, process 600 can warp the single image created at block 604, or an individual one of the multiple images obtained at block 602, based on the determined distances. This warping can occur using known procedures to modify the image to be from a perspective offset from the actual point at which the camera is from the user's eye, modifying the image to be from the user's perspective. In some implementations, this can be accomplished by warping the single combined image by an average of the distances and directions determined at block 606. In some implementations, each part of the combined single image can be warped based on the source image that part was obtained from and the distance and direction obtained for that source image. In some implementations, images are first warped to be from the user's perspective, performing blocks 606 and 608 for each image, before matching and merging the warped images at block 604. The single image, now from the user's perspective, can then be returned by process 600 and process 600 can end. An example of determining distances between cameras and a user's eye and using the distances to warp an image to be from the user's perspective is described below in relation to FIG. 10C.

Figure 7:
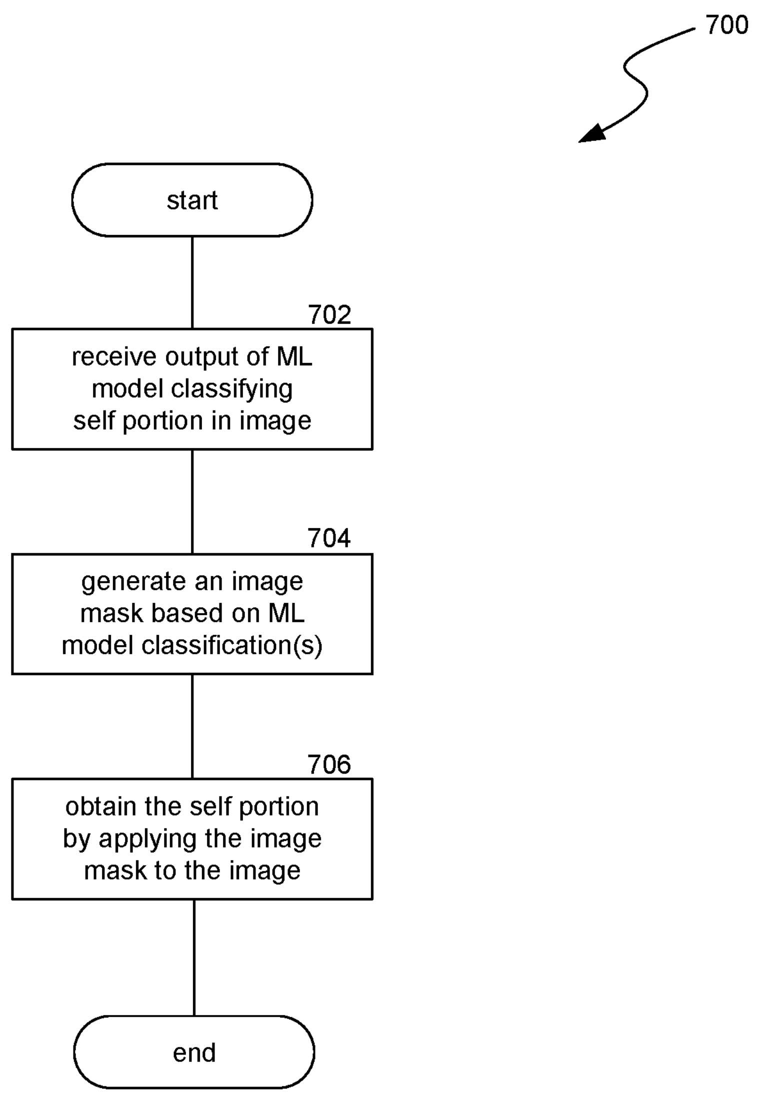
FIG. 7 is a flow diagram illustrating a process used in some implementations of the present technology for obtaining a self portion of an image.

FIG. 7 is a flow diagram illustrating a process 700 used in some implementations for obtaining a self portion of an image. In some implementations, process 700 can be performed as a sub-process of process 500, e.g., called at block 506.

At block 702, process 700 can receive output of a machine learning (ML) model classifying which parts of an image are a self portion. In various implementations, this classification can be provided on a pixel by pixel basis or for another quantity of the image, such as for a square millimeter, for five or ten square pixels, etc. In various implementations, this classification can be accomplished by applying a machine learning model, such as a deep neural network, trained to identify a self portion of an image. In some implementations, the classification of each area can be based on analysis of areas around it and/or for areas of larger or smaller portions of the image, e.g., by using a recurrent and/or convolutional neural network or another progressive type of machine learning model. One way to train such models is by using a set of training images where a portion of at least some of the images are labeled as a self portion. In some implementations, the machine learning output classification can be more specific than just a binary indication of being or not being part of a self portion. In these cases, the classification can also specify a body part to which each part of the self portion corresponds. An example of classifying portions of an image as self portions is described below in relation to FIG. 11A.

At block 704, process 700 can generate an image mask based on the self portion classification(s) from block 702. The image mask can be one or more identified areas for which each internal part of those areas have been classified as a self portion. In some implementations, generating the mask can include further processing, such as by excluding contiguous areas of the image, each classified as a self portion, that together are below a threshold size; excluding all but the largest contiguous set of areas classified as self portions; and/or, where the classifications identify specific body parts, excluding any areas that are not connected to areas classified as hands, feet, legs, or a torso of the user. An example of generating a mask based on identified self portions is described below in relation to FIG. 11A.

At block 706, process 700 can obtain the self portion of the image by applying to it the mask generated at block 704. Applying a mask can extract any portion of the image with which the mask overlaps. Process 700 can then return the extracted self portion and end. An example of applying a mask to extract a self portion from an image is described below in relation to FIG. 11B.

Figure 8:
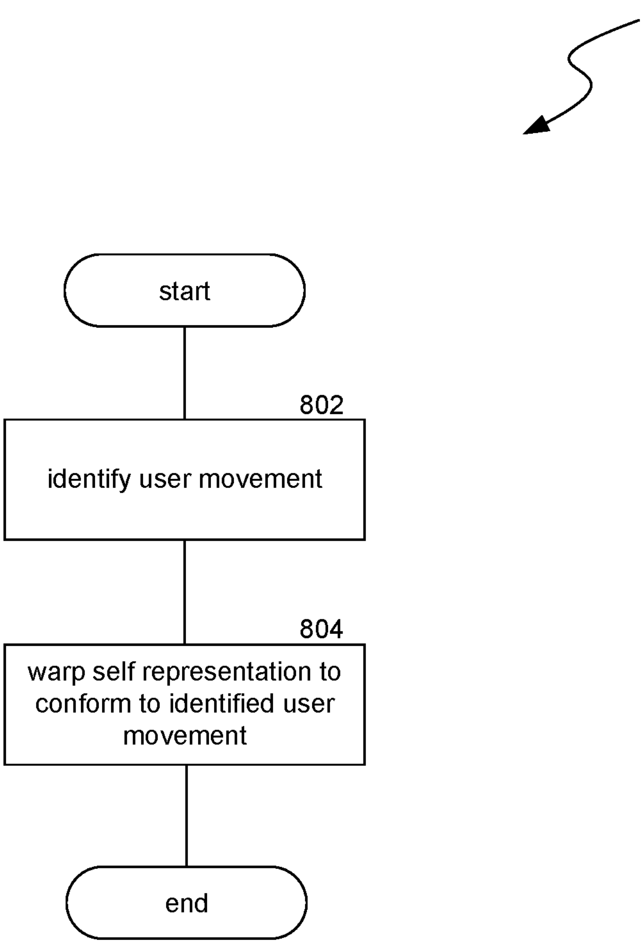
FIG. 8 is a flow diagram illustrating a process used in some implementations of the present technology for updating a self representation based on an identified user movement.

FIG. 8 is a flow diagram illustrating a process 800 used in some implementations for updating a self representation based on an identified user movement. In some implementations, process 800 can be performed in between executions of process 500, e.g., to update a self representation from process 500 before process 500 can be performed a second time to produce a new self representation.

At block 802, process 800 can identify a user movement. In some implementations, process 800 can accomplish this by tracking a user body part, e.g., a hand, arm, leg, or torso, using a camera of the artificial reality system. In other implementations, process 800 can accomplish this by tracking a controller of the artificial reality system. For example, the controller can have a positioning system, e.g., based on tracked light points emitted by the controller, inertial motion or position sensors, etc. An example of identifying a user movement is described below in relation to FIG. 12A.

At block 804, process 800 can warp the self representation to conform to the identified movement. Warping algorithms can change an image based on an identified positional change of a part of the image. For example, the positional change can be represented by a set of vectors, which can be applied to move portions of the image. As another example, the movement can correspond to a particular body part. In this case, the image can be analyzed to identify body parts in the image (or can be previously identified, e.g., as discussed above in relation to blocks 702 and 704) and the parts of the image corresponding to the identified moved body part can be modified (e.g., rotated, re-sized, or otherwise warped), to correspond to the user movement. In some implementations, only user motions below a threshold size are used to warp a self representation, as larger warping can cause the self representation to no longer resemble the user, creating a jarring experience for the user. Process 800 can show the modified self representation in the artificial reality environment and can then end.

Figure 9A:
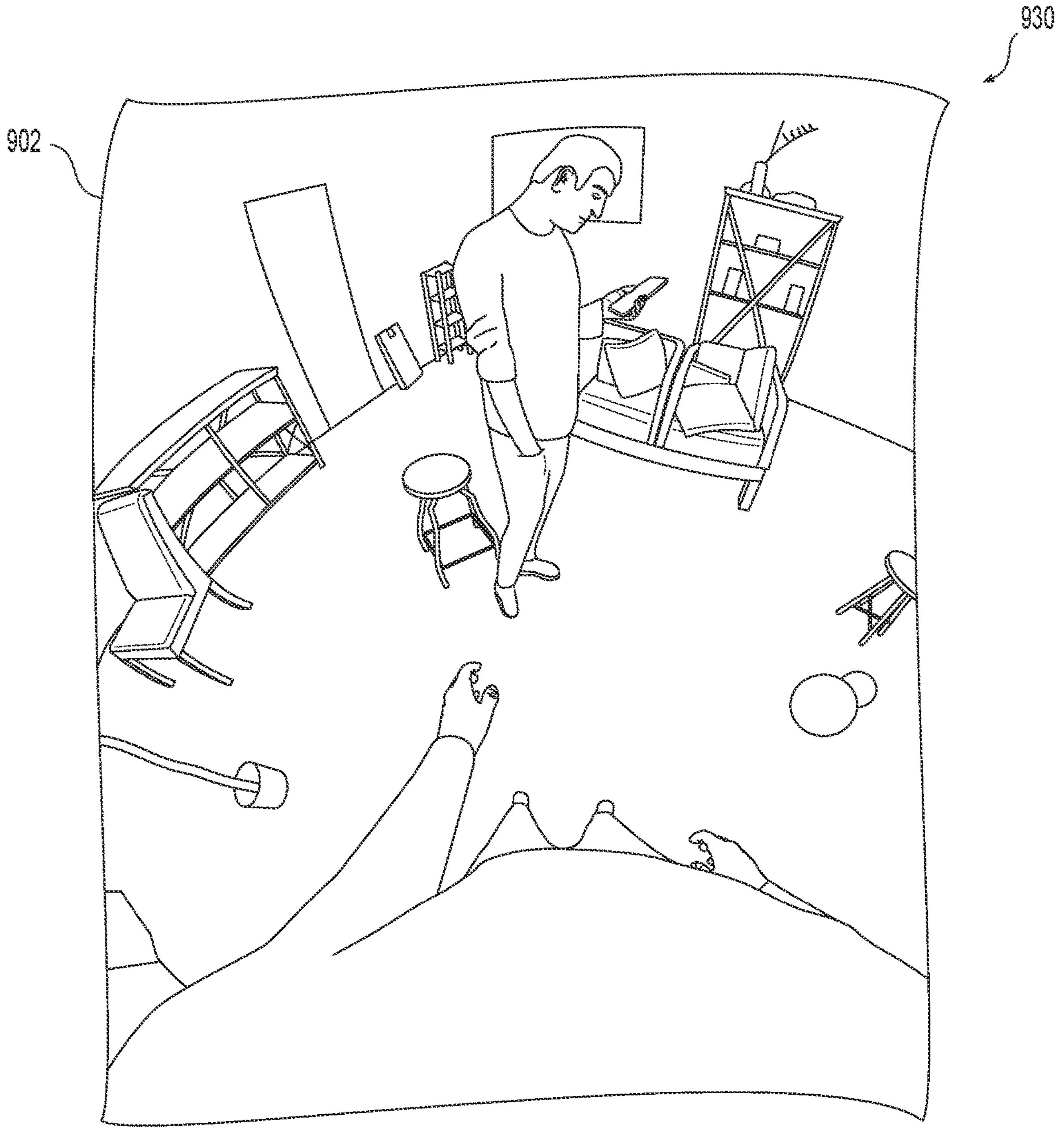
FIGS. 9A-9C are conceptual diagrams illustrating an example of extracting a self portion from an image and using it to create a self representation in an artificial reality environment.
Figure 9B:
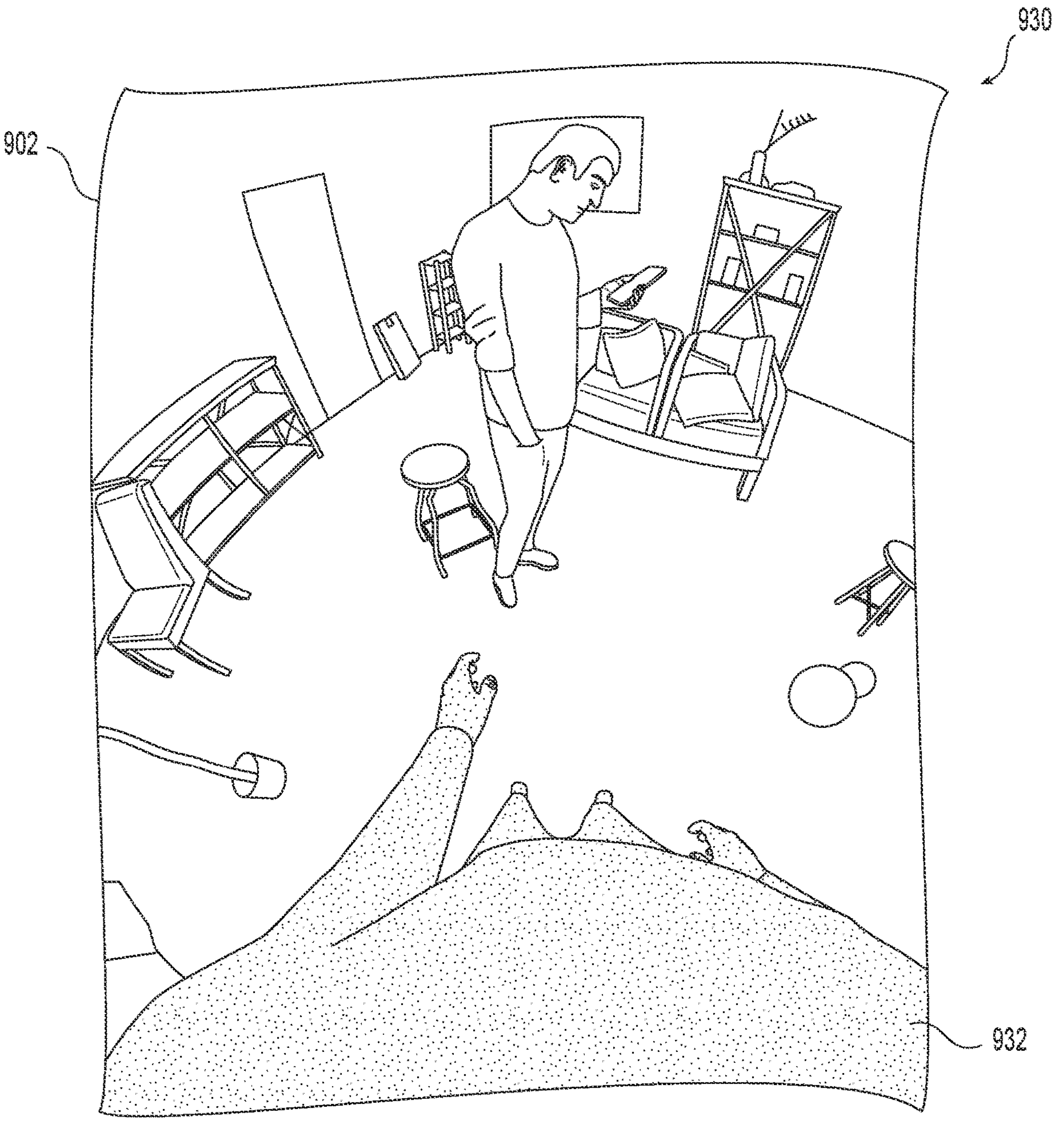
Figure 9C:
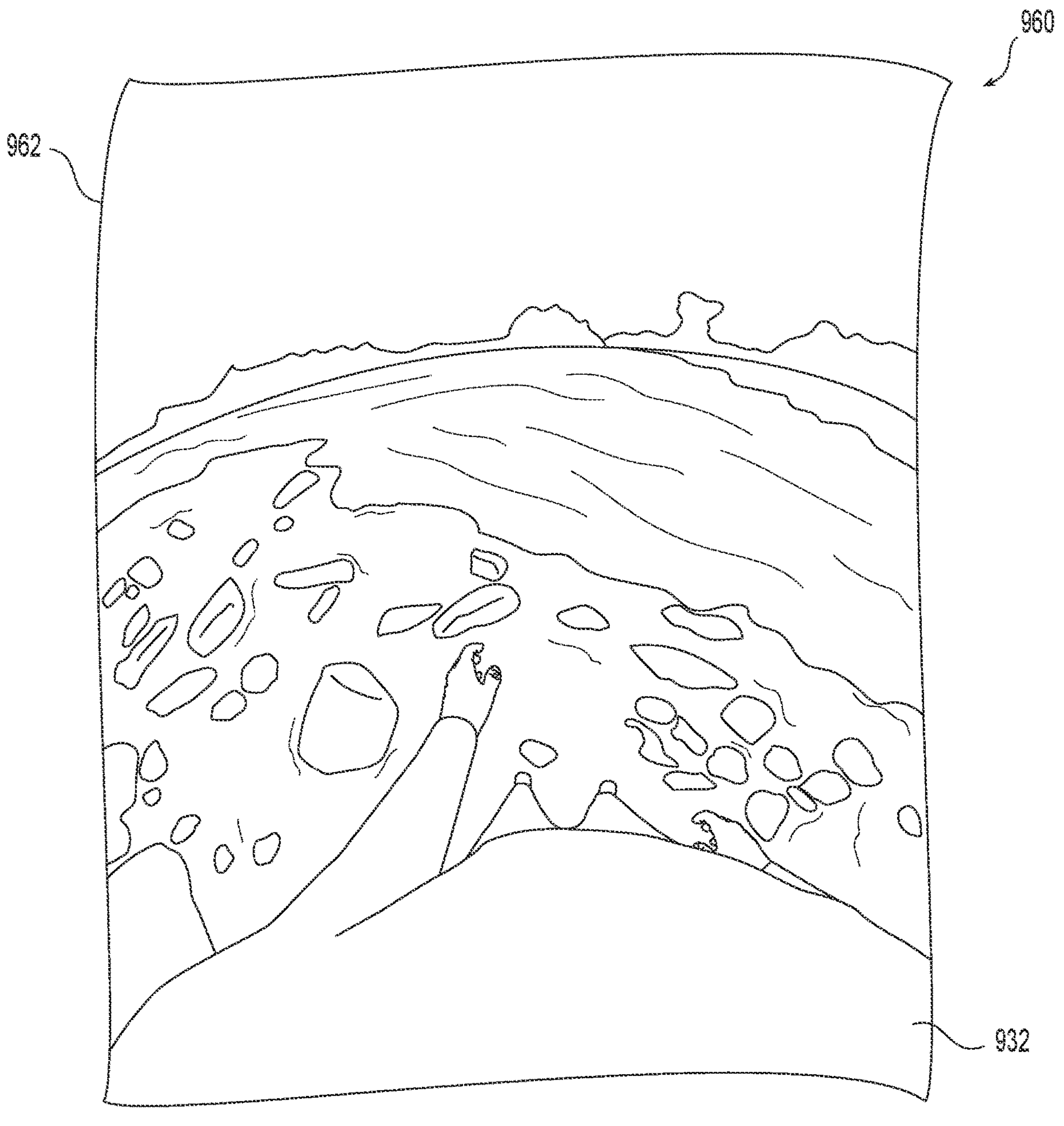

FIGS. 9A-9C are conceptual diagrams illustrating an example of extracting a self portion from an image and using it to create a self representation in an artificial reality environment. Referring to FIGS. 9A-9C together, this example begins at 900 showing an input image 902 taken by a camera mounted on a headset of an artificial reality system. This example continues at 930 where the shaded self portion 932 of image 902 has been classified by a machine learning model (as shown in the example in FIG. 11). Next, at 960, the self portion 932 has been incorporated into an artificial reality environment as a self representation.

Figure 10A:
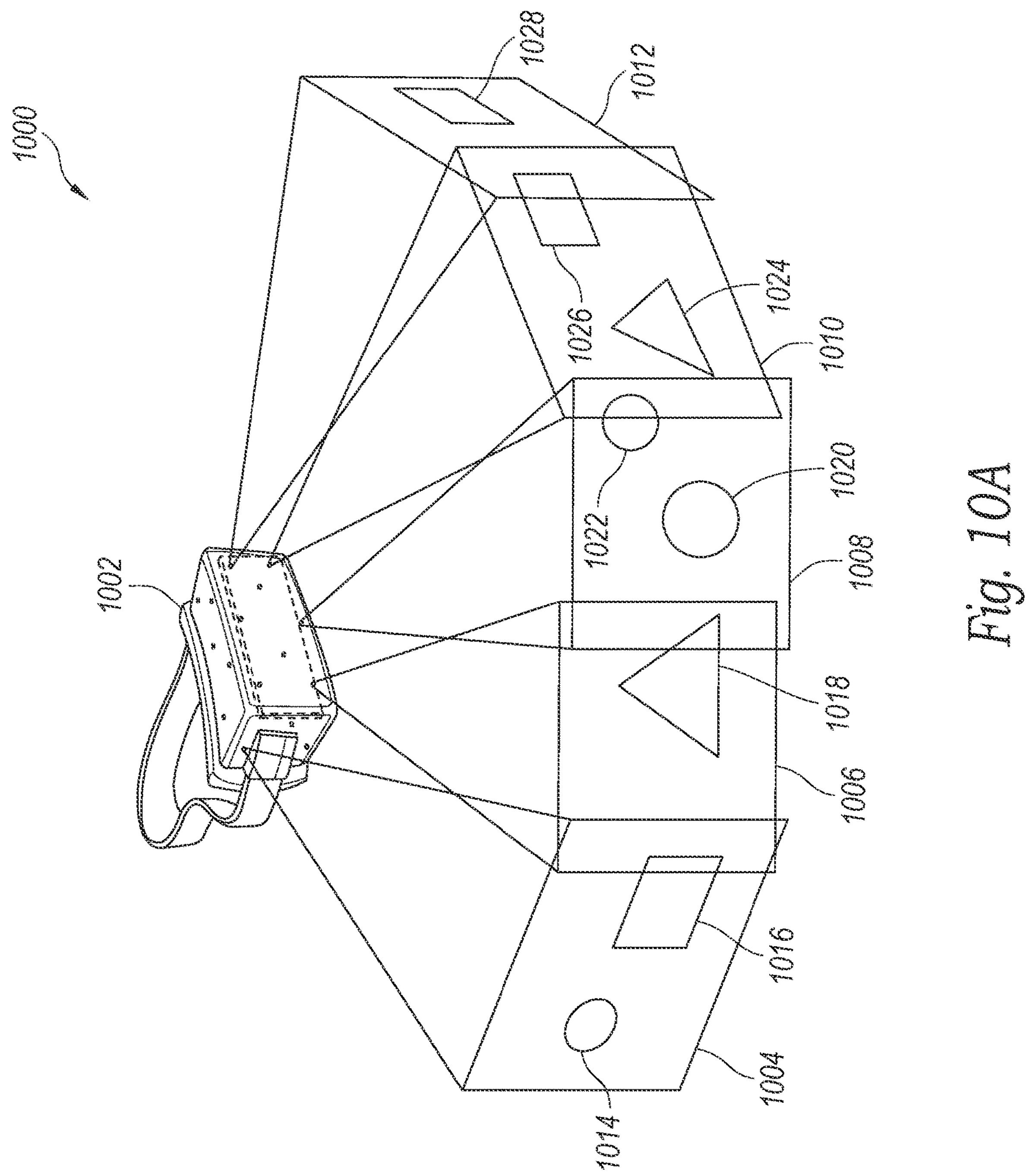
FIGS. 10A-10C are conceptual diagrams illustrating an example of an artificial reality system capturing multiple images, merging them, and warping them to be from the user's perspective.
Figure 10B:
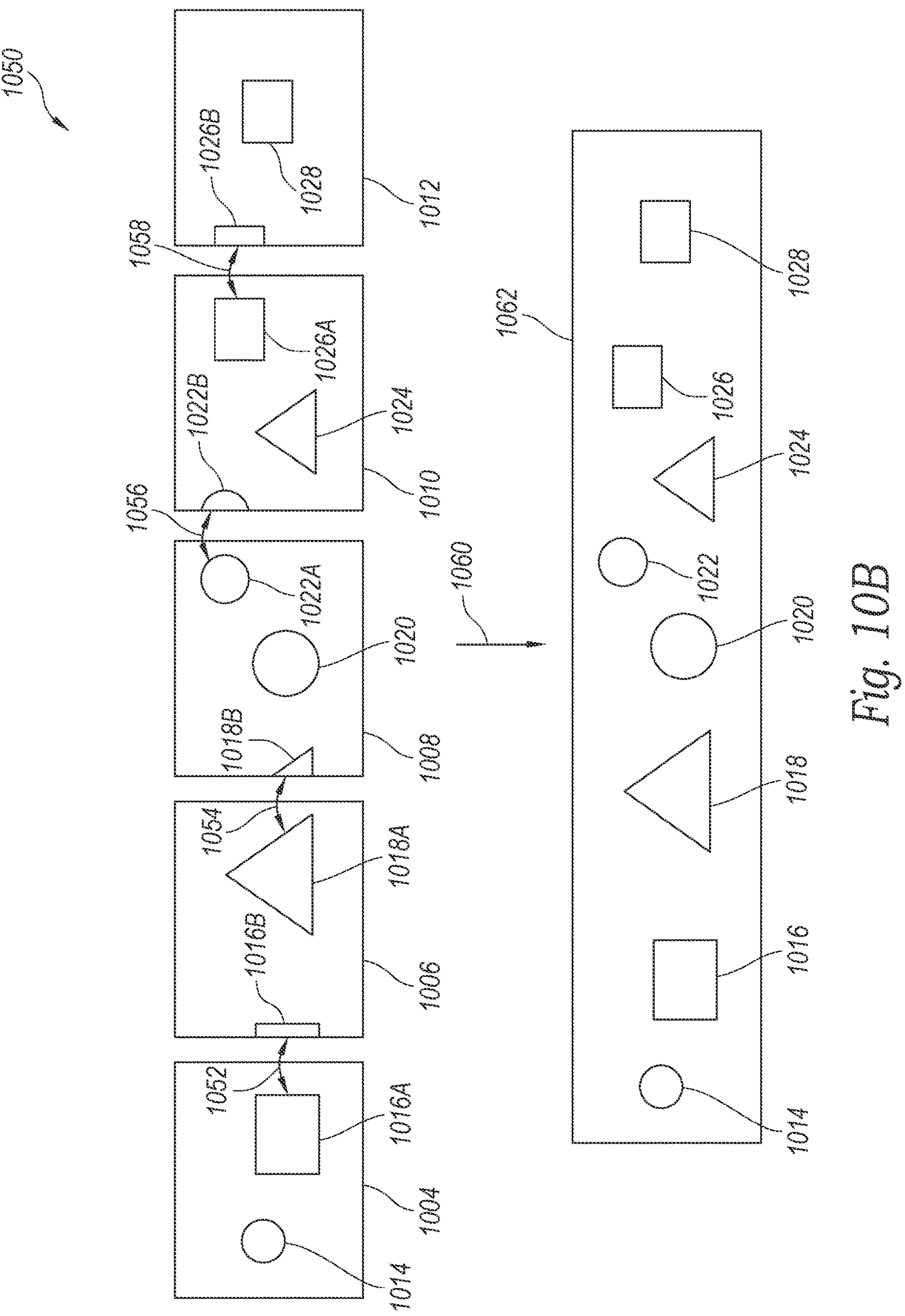
Figure 10C:
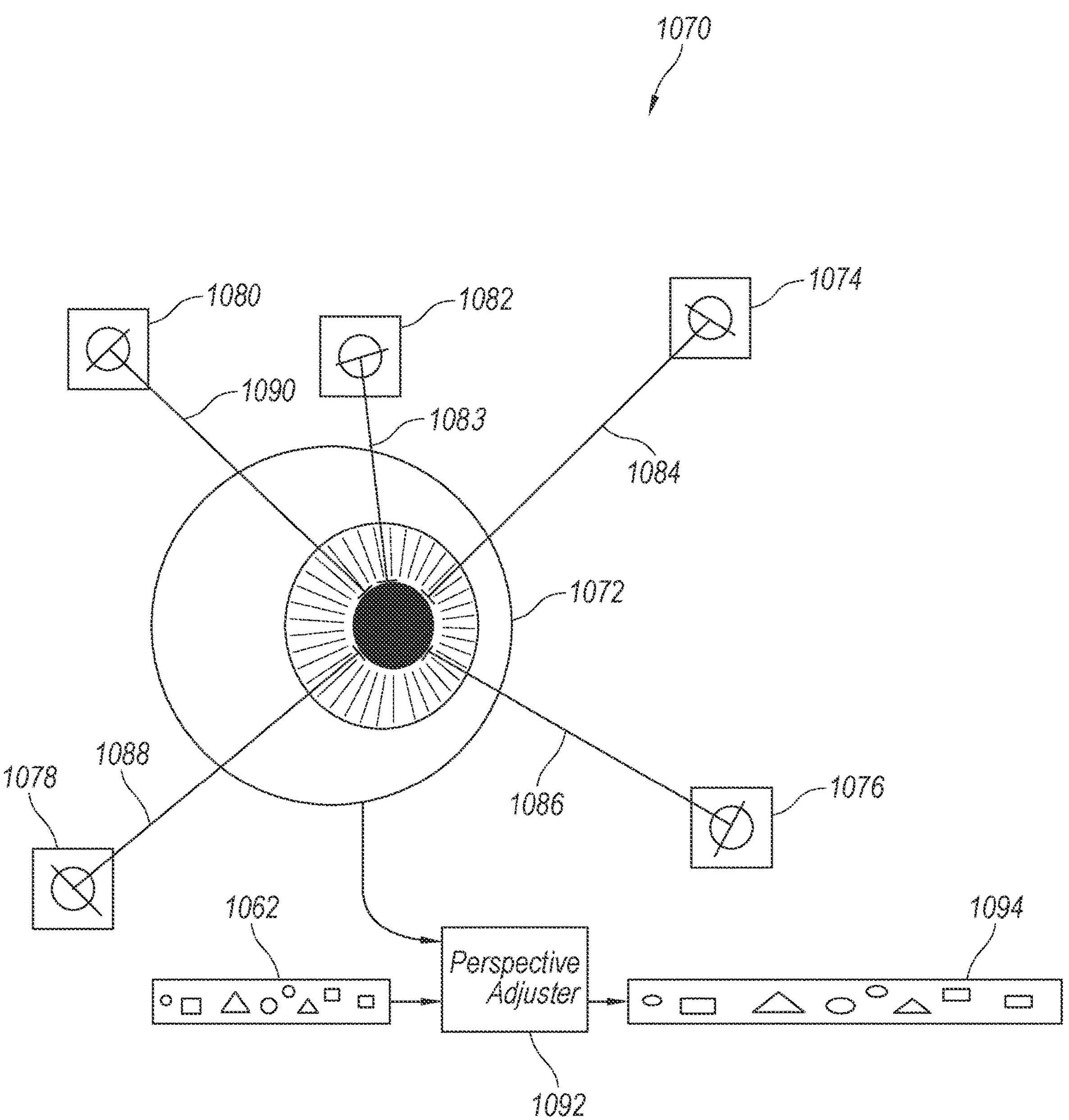

FIGS. 10A-10C are conceptual diagrams illustrating an example of an artificial reality system capturing multiple images, merging them, and warping them to be from the user's perspective. Referring to FIGS. 10A-10C together, at 1000, the example shows a headset 1002 of an artificial reality system with multiple cameras capturing multiple contemporaneous images 1004-1012. These images depict features 1014-1028, some of which are at least partially depicted in more than one of the images 1004-1012.

At 1050, the example continues where the features 1014-1028 are matched between the images 1004-1012. In particular, at 1052 feature 1016A is matched with the partial feature 1016B, at 1054 feature 1018A is matched with the partial feature 1018B, at 1056 feature 1022A is matched with the partial feature 1022B, and at 1058 feature 1026A is matched with the partial feature 1026B. As indicated by arrow 1060, based on these matched features, the images 1004-1012 are combined into a single image 1062, including each of the features 1014-1028.

At 1070, the example illustrates the artificial reality system determining distances 1083-1090 (with directions) between eye 1072 and cameras 1074-1082. These distances (e.g., vectors) are provided to the perspective adjuster 1092. Also provided to the perspective adjuster 1092 is the combined image 1062. The perspective adjuster 1092 modifies the combined image 1062, based on the determined distances with directions 1083-1090, to be an image 1094, which is from the perspective of the user's eye 1072.

Figure 11A:
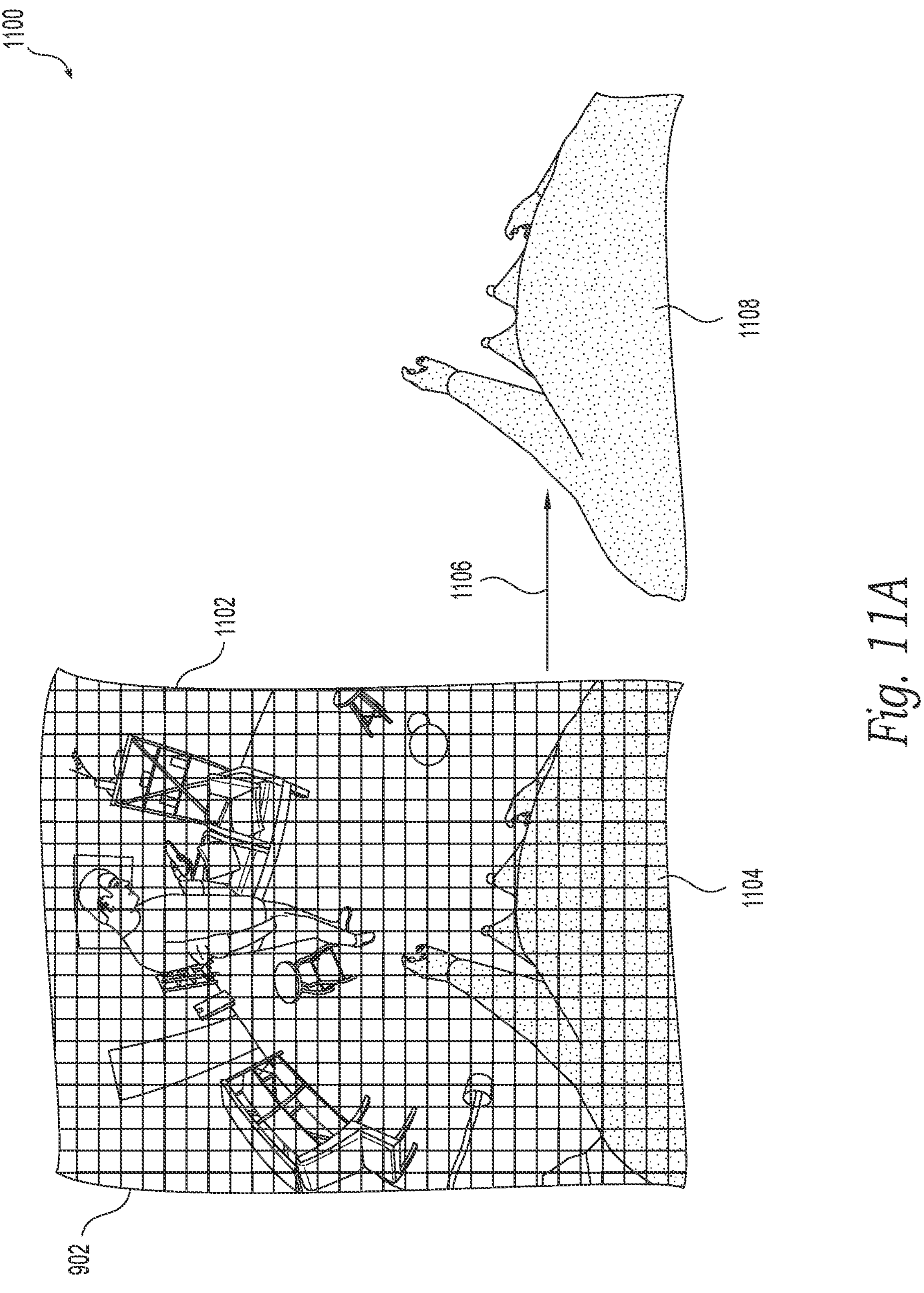
FIGS. 11A and 11B are conceptual diagrams illustrating an example of creating an image mask for an image and using the image mask to extract a self portion from the image.
Figure 11B:
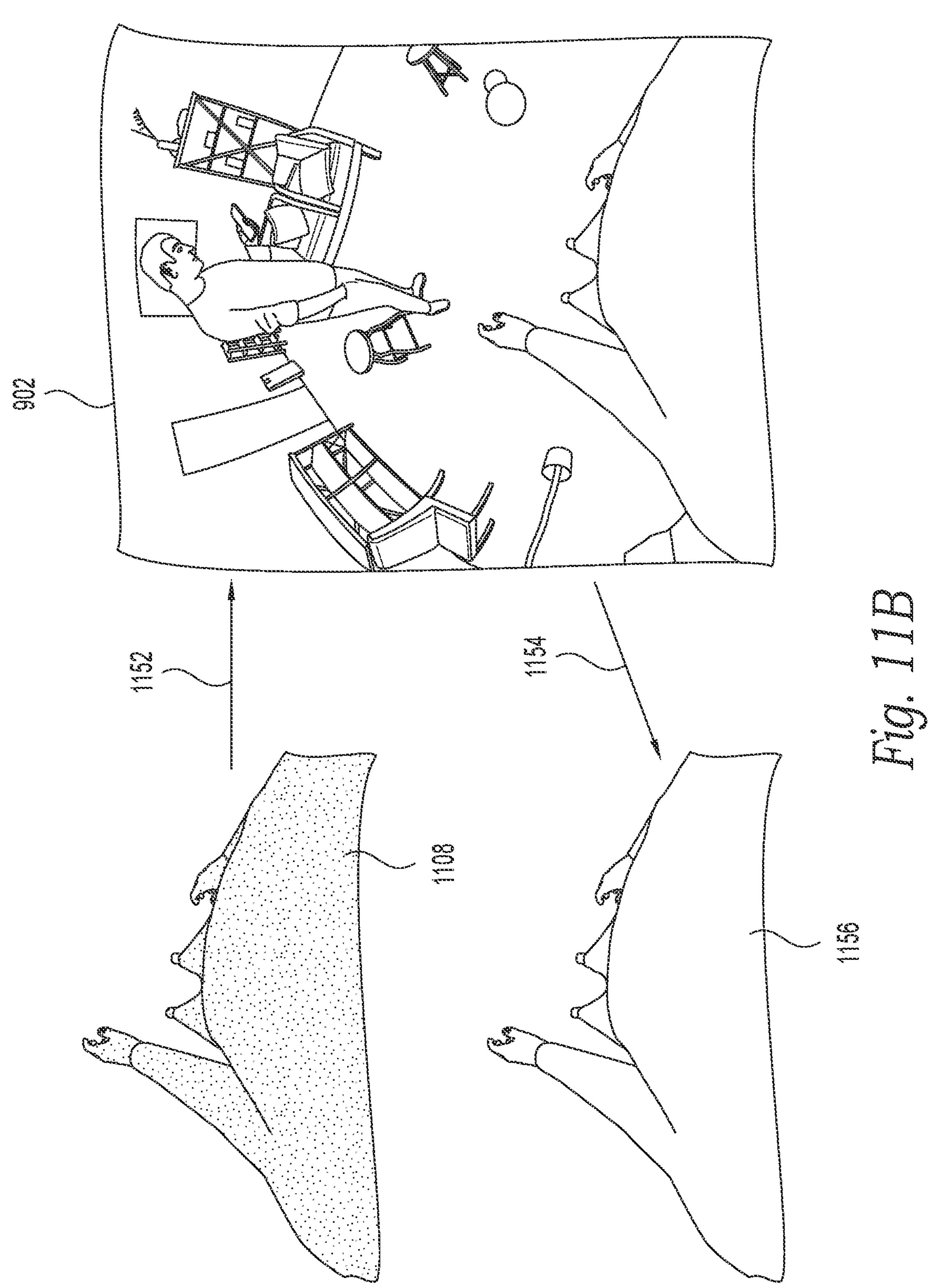

FIGS. 11A and 11B are conceptual diagrams illustrating an example of creating an image mask for an image and using the image mask to extract a self portion from the image. Referring to FIGS. 11A and 11B together, this example begins at 1100, where a machine learning model classifies portions of image 902 (the portions shown as a grid of areas of image 902), such as portions 1102 and 1104 as either being part of a self portion (the shaded portions such as portion 1104) or not (the unshaded portions such as portion 1102). As indicated by arrow 1106, the portions classified as self portions are used to create a mask 1108.

Next, at 1150, the example continues by applying the mask 1108 to the image 902, as shown by arrow 1152. Applying the mask 1108 to the image 902 extracts the self portion 1156 from the image 902, as shown by arrow 1154.

Figure 12A:
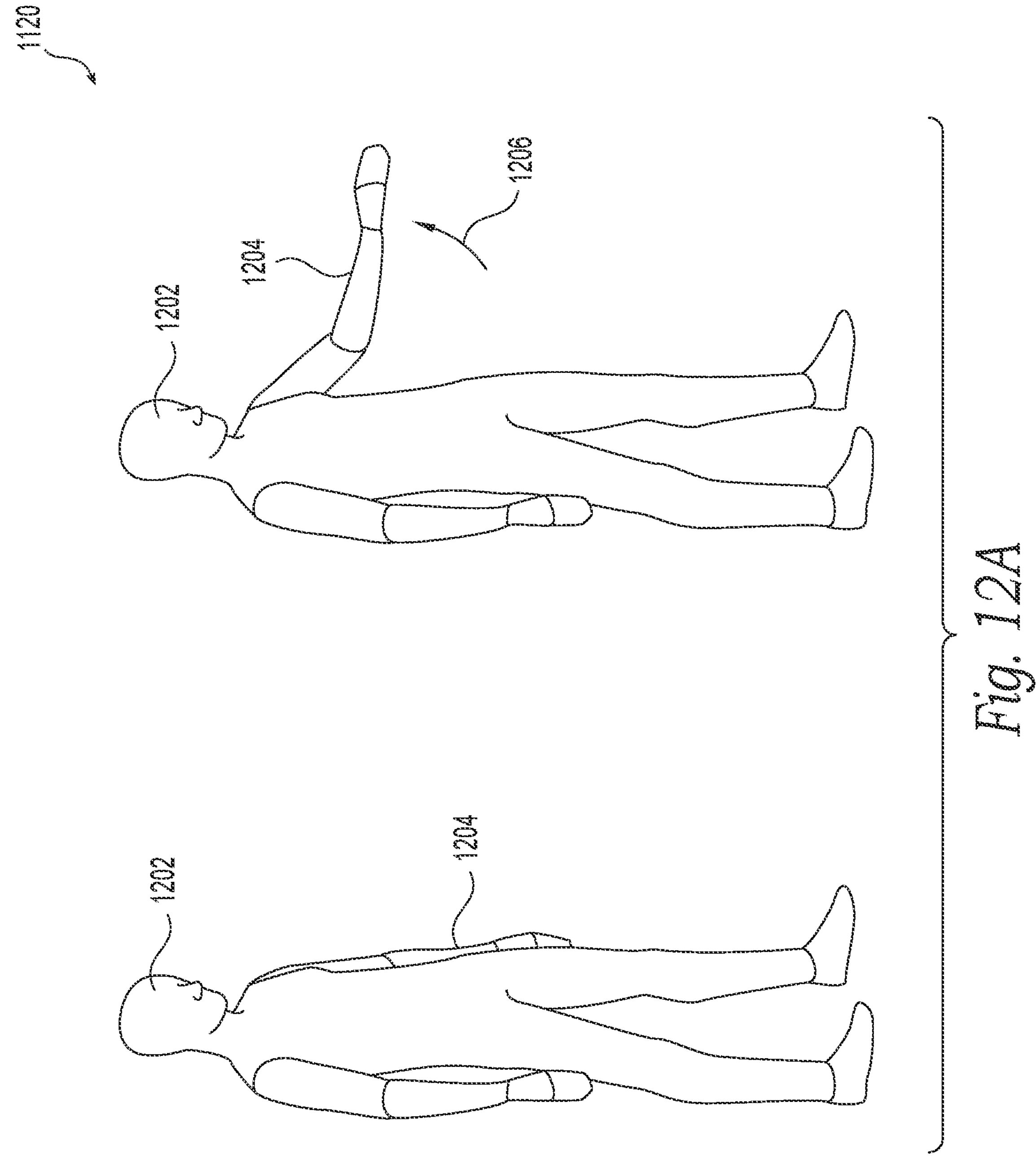
FIGS. 12A and 12B are conceptual diagrams illustrating an example of warping a self representation based on an identified user movement.
Figure 12B:
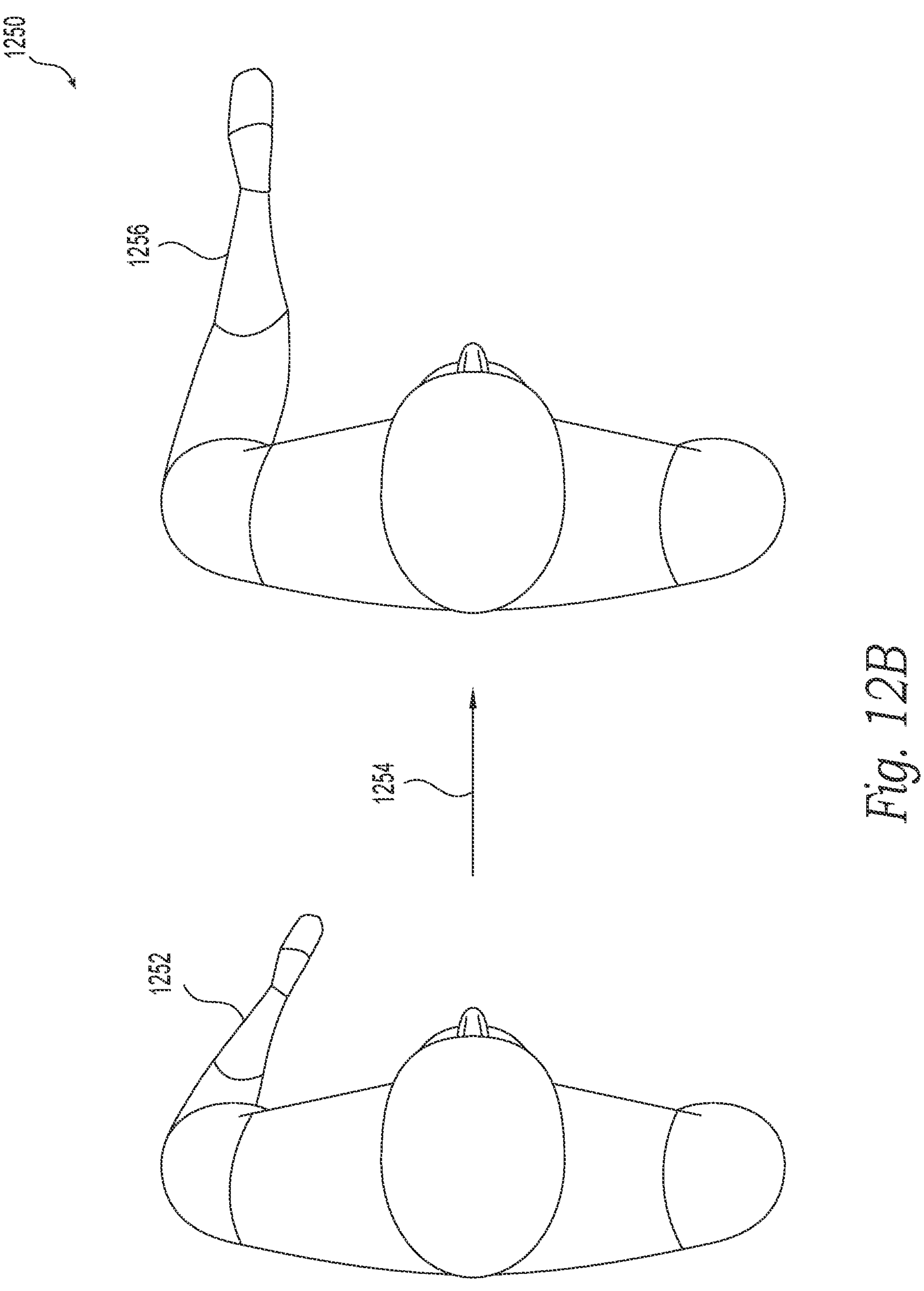

FIGS. 12A and 12B are conceptual diagrams illustrating an example of warping a self representation based on an identified user movement. Referring to FIGS. 12A and 12B together, this example starts at 1200 where the movements of a user 1202 are being monitored. As shown by arrow 1206, the artificial reality system identifies that the user 1202's arm 1204 has moved up and out. Next, at 1250, the example continues by modifying, as indicated by arrow 1254, a representation of the user's arm 1252 (which is part of a self representation in an artificial reality environment) to show the user's arm 1256 adjusted for the movement 1206. Thus, the example modifies the self representation to conform to the movement 1206 quickly, without having to capture new user images, extract self portions, and create new self representations for each small user movement.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for providing a secured self representation of a user in an artificial reality (XR) environment, the method comprising:

receiving, by a secure application with permission to write to an output frame buffer, one or more images captured in real time by one or more cameras on an XR system;

selecting, by the secure application and a machine learning model trained to identify a portion of the user in an image, a secured self representation in each of the one or more images, wherein the secured self representation includes the portion of the user;

accessing, by the secure application, the frame buffer through which one or more other applications are providing XR content in the XR environment;

determining a portion of the frame buffer relative to the secured self representation; and displaying, in the XR environment, the secured self representation by writing the secured self representation to the portion of the frame buffer after the one or more other applications have written to the frame buffer, wherein:

the one or more other applications cannot access the secured self representation written to the frame buffer; and the one or more other applications cannot access the one or more images received by the secure application.

2. The method of claim 1, further comprising:

identifying a user movement based on identified movement of a controller or a tracked body part of the user;

determining one or more distances and directions of the user movement; and based on the one or more determined distances and directions of the user movement, adjusting the secured self representation to conform to the identified movement.

3. The method of claim 2, wherein:

adjusting the secured self representation includes warping portions of the secured self representation that match the tracked body part of the user in accordance with the identified movement for the tracked body part of the user; and warping portions of the secured self representation includes moving and/or resizing portions of the secured self representation that match the tracked body part of the user.

4. The method of claim 1 further comprising adjusting at least part of the one or more images to appear to be from a user's perspective according to one or more distances between A) at least one eye of the user and B) multiple cameras on an artificial reality system.

5. The method of claim 1, wherein selecting the secured self representation includes:

generating an image mask based on an output of the machine learning model; and applying the image mask to at least a portion of the one or more images to obtain the secured self representation of each of the one or more images.

6. The method of claim 1, wherein the machine learning model is trained using a set of images with portions of each image tagged to indicate whether that portion depicts a respective portion of a user or not.

7. The method of claim 1, wherein selecting the secured self representation in each respective image of the one or more images includes classifying parts of the respective image as depicting particular body parts of the user.

8. The method of claim 7 further comprising:

receiving, from one of the one or more other applications, an indication of an effect to apply to a depiction of a particular body part of the user; and applying, based on the classified parts of the respective image as depicting the particular body parts of the user, the effect to the depiction of the particular body part of the user.

9. The method of claim 1, further comprising receiving, from one of the one or more other applications, an indication of an effect to apply to at least part of the displayed secured self representation; and applying the effect to the secured self representation before the secured self representation is written to the portion of the frame buffer.

10. The method of claim 9, wherein the effect comprises one or more of: a color; a shading; a warp or distortion field; a composite layer to overlay onto the at least part of the secured self representation; or any combination thereof.

11. A non-transitory computer-readable storage medium storing instructions that, when executed by a computing system, cause the computing system to perform operations for providing a secured self representation of a user in an artificial reality (XR) environment, the operations comprising:

receiving, by a secure application with permission to write to an output frame buffer, one or more images captured in real time by one or more cameras on an XR system;

selecting, by the secure application and a machine learning model trained to identify a portion of the user in an image, a secured self representation in each of the one or more images, wherein the secured self representation includes the portion of the user;

accessing, by the secure application, a frame buffer through which one or more other applications are providing XR content in the XR environment;

determining a portion of the frame buffer for the secured self representation; and displaying, in the XR environment, the secured self representation by writing the secured self representation to the portion of the frame buffer after the one or more other applications have written to the frame buffer, wherein:

the one or more other applications cannot access the secured self representation written to the frame buffer; and the one or more other applications cannot access the one or more images received by the secure application.

12. The non-transitory computer-readable storage medium of claim 11, wherein the operations further comprise:

identifying a user movement based on identified movement of a controller or a tracked body part of the user;

determining one or more distances and directions of the user movement; and based on the one or more determined distances and directions of the user movement, adjusting the secured self representation to conform to the identified movement.

13. The non-transitory computer-readable storage medium of claim 12, wherein;

adjusting the secured self representation includes warping portions of the secured self representation that match the tracked body part of the user in accordance with the identified movements for the tracked body part of the user; and warping portions of the secured self representation includes moving and/or resizing portions of the secured self representation that match the tracked body part of the user.

14. The non-transitory computer-readable storage medium of claim 11, wherein the operations further comprise adjusting at least part of the one or more images to appear to be from a user's perspective according to one or more distances between A) at least one eye of the user and B) multiple cameras on an artificial reality system.

15. The non-transitory computer-readable storage medium of claim 11, wherein selecting the secured self representation includes:

generating an image mask based on output of one or more machine learning models; and applying the image mask to at least a portion of the one or more images to obtain the secured self representation portion of each of the one or more images.

16. The non-transitory computer-readable storage medium of claim 15, wherein the one or more machine learning models are trained using a set of images with portions of each image tagged to indicate whether that portion depicts a respective portion of a user or not.

17. A computing system for providing a secured self representation of a user in an artificial reality (XR) environment, the computing system comprising:

one or more processors; and one or more memories storing instructions that, when executed by the one or more processors, cause the computing system to perform a process comprising:

receiving, by a secure application with permission to write to an output frame buffer, one or more images captured in real time by one or more cameras on an XR system;

selecting, by the secure application and a machine learning model trained to identify a portion of the user in an image, a secured self representation in each of the one or more images, wherein the secured self representation includes the portion of the user;

accessing, by the secure application, a frame buffer through which one or more other applications are providing XR content in the XR environment;

determining a portion of the frame buffer for the secured self representation; and displaying, in the XR environment, the secured self representation by writing the secured self representation to the portion of the frame buffer after the one or more other applications have written to the frame buffer, wherein:

the one or more other applications cannot access the secured self representation written to the frame buffer; and the one or more other applications cannot access the one or more images received by the secure application.

18. The computing system of claim 17, wherein selecting the secured self representation in each respective image of the one or more images includes classifying parts of the respective image as depicting particular body parts of the user; and wherein the process further comprises:

receiving, from one of the one or more other applications, an indication of an effect to apply to a depiction of a particular body part of the user; and applying, based on the classified parts of the respective image as depicting the particular body parts of the user, the effect to the depiction of the particular body part of the user.

19. The computing system of claim 17, wherein the process further comprises:

receiving, from one of the one or more other applications, an indication of an effect to apply to at least part of the displayed secured self representation; and applying the effect to the secured self representation before the secured self representation is written to the portion of the frame buffer.

20. The computing system of claim 19, wherein the effect comprises one or more of: a color; a shading; a warp or distortion field; a composite layer to overlay onto the at least part of the secured self representation; or any combination thereof.

* * * * *